US009249727B2

(12) United States Patent
Matos

(10) Patent No.: US 9,249,727 B2
(45) Date of Patent: Feb. 2, 2016

(54) RETRACTABLE BIRD AND DEBRIS DEFLECTOR FOR AN AIRCRAFT JET ENGINE

(71) Applicant: Jeffrey A. Matos, New Rochelle, NY (US)

(72) Inventor: Jeffrey A. Matos, New Rochelle, NY (US)

(*) Notice: Subject to any disclaimer, the term of this patent is extended or adjusted under 35 U.S.C. 154(b) by 494 days.

(21) Appl. No.: 13/799,396

(22) Filed: Mar. 13, 2013

(65) Prior Publication Data

US 2013/0213003 A1 Aug. 22, 2013

Related U.S. Application Data

(63) Continuation-in-part of application No. 12/689,554, filed on Jan. 19, 2010, now Pat. No. 8,429,890.

(60) Provisional application No. 61/205,381, filed on Jan. 16, 2009, provisional application No. 61/205,785, filed on Jan. 22, 2009.

(51) Int. Cl.
*F02C 7/00* (2006.01)
*B64D 33/02* (2006.01)
*F02C 7/055* (2006.01)

(52) U.S. Cl.
CPC . *F02C 7/00* (2013.01); *B64D 33/02* (2013.01); *F02C 7/055* (2013.01); *B64D 2033/022* (2013.01); *F05D 2250/131* (2013.01); *Y02T 50/672* (2013.01)

(58) Field of Classification Search
CPC ........... F02C 7/00; F02C 7/055; B64D 33/02; B64D 2033/022; F05D 2250/131; Y02E 50/672
See application file for complete search history.

(56) References Cited

U.S. PATENT DOCUMENTS

| | | | | |
|---|---|---|---|---|
| 2,704,136 A | * | 3/1955 | Rainbow | B64D 33/02 55/306 |
| 2,944,631 A | * | 7/1960 | Kerry | B64D 33/02 55/306 |
| 3,121,545 A | * | 2/1964 | Meletion | B64D 33/02 244/53 B |
| 3,196,598 A | * | 7/1965 | Olson | B64D 33/02 415/121.2 |
| 3,426,981 A | * | 2/1969 | Allcock | B64D 15/00 137/15.1 |
| 3,485,252 A | * | 12/1969 | Brown | F02C 7/042 137/15.1 |
| 3,568,694 A | * | 3/1971 | Johnson | B64D 33/02 137/15.1 |
| 3,905,566 A | * | 9/1975 | Anderson | B64D 33/02 244/53 B |

(Continued)

*Primary Examiner* — Ehud Gartenberg
*Assistant Examiner* — Karthik Subramanian
(74) *Attorney, Agent, or Firm* — Karl F. Milde, Jr.; Eckert Seamans Cherin & Mellott, LLC

(57) ABSTRACT

A retractable deflector to deflect birds and debris from an air intake duct of an aircraft jet engine. The duct has a forward opening for air receipt. The deflector includes a plurality of elongate members disposed on the duct in spaced relation to each other, each member having two end segments and a central segment disposed between the two end segments; and a plurality of guiding members, each mounted for movement along the perimeter of the duct and coupled to one end segment of an elongate member. The central segment of each elongate member extends between a pair of guiding members such that the elongate member is movable by a respective pair of guiding members between a retracted position and a deployed position in front of the duct. When in the deployed position, the central segments are situated to impede the ingress of debris into the duct.

23 Claims, 46 Drawing Sheets

(56) References Cited

U.S. PATENT DOCUMENTS

| | | | | |
|---|---|---|---|---|
| 4,004,760 A * | 1/1977 | Ando | B64D 33/02 | 244/53 B |
| 4,070,827 A * | 1/1978 | Vanfleet | F02C 7/05 | 415/121.2 |
| 4,137,535 A * | 1/1979 | Rupprecht | H01Q 1/1235 | 343/902 |
| 4,354,346 A * | 10/1982 | Wooding | B64D 33/02 | 55/306 |
| 5,102,375 A * | 4/1992 | Featherstone | B66F 3/06 | 227/99 |
| 5,123,240 A * | 6/1992 | Frost | F02K 7/075 | 244/53 B |
| 5,139,464 A * | 8/1992 | Lehnert | E04H 12/185 | 474/155 |
| 5,385,612 A * | 1/1995 | Li | B60R 1/0602 | 134/113 |
| 5,411,224 A * | 5/1995 | Dearman | B64D 33/02 | 244/53 B |
| 5,779,169 A * | 7/1998 | Sloan | B64C 15/14 | 239/265.25 |
| D433,029 S * | 10/2000 | Eidson | D12/345 | |
| 6,872,232 B1 * | 3/2005 | Pavlatos | B01D 45/12 | 55/306 |
| 6,883,751 B2 * | 4/2005 | Koncsek | B64D 33/02 | 244/53 B |
| 6,910,327 B2 * | 6/2005 | Sakurai | B64D 33/02 | 137/15.1 |
| 6,945,494 B2 * | 9/2005 | Bagnall | B64D 33/02 | 244/53 B |
| 6,994,738 B2 * | 2/2006 | Taddey | B01D 45/04 | 55/306 |
| D631,420 S * | 1/2011 | Locklear | D12/345 | |
| 7,871,455 B1 * | 1/2011 | Sands | B64D 33/02 | 244/53 B |
| 8,052,083 B1 * | 11/2011 | Moran | B64D 33/02 | 244/53 B |
| 8,117,820 B1 * | 2/2012 | Briscoe | F02C 7/05 | 137/15.1 |
| 2004/0144097 A1 * | 7/2004 | Grimlund | F02C 7/042 | 60/772 |
| 2010/0270427 A1 * | 10/2010 | Barrientos | B64D 33/02 | 244/1 R |
| 2011/0000184 A1 * | 1/2011 | Baugh | B64D 33/02 | 60/39.092 |
| 2011/0011055 A1 * | 1/2011 | Troy | F02C 7/055 | 60/39.092 |

\* cited by examiner

RETRACTABLE BIRD AND DEBRIS DEFLECTOR FOR AN AIRCRAFT JET ENGINE

CROSS REFERENCE TO RELATED APPLICATIONS

The subject matter of this application is related to, and claims priority from, the following provisional and utility applications:
1) Provisional Application No. 61/205,381 filed Jan. 16, 2009, and 2) Provisional Application No. 61/205,785 filed Jan. 22, 2009; and
2) U.S. patent application Ser. No. 12/689,554, filed Jan. 19, 2010 (now allowed), from which this application is a continuation-in-part.]

Large sized debris which enters the intake of a jet engine may have disastrous consequences, including engine damage, functional engine destruction, and, if all or most engines become non-functional, emergency termination of a flight. This is what occurred on Jan. 15, 2009 with a flight out of LaGuardia Airport which made an emergency landing in the Hudson River after both of its engines failed: The source of damage was a flock of birds some of which entered the air intake of the engines, and rendered both engines non-functional.

U.S. Pat. No. 4,354,346 to Wooding discloses an intake duct for a jet engine which is not retractable. The engine intake extension of the invention is long and expected to be aerodynamically very demanding.

U.S. Design Pat. No. 433,029 to Eidson comprises an non-retractable cowl. Because it is non-retractable, it will exert aerodynamic inefficiencies throughout a flight.

U.S. Pat. No. 5,385,612 to Li discloses a cleaning system which is intended to be useful for jet engine intake. However, the device is not retractable, and is not able to provide jet air intake without very substantial aerodynamic limitation.

U.S. Pat. Nos. 4,137,535; 5,102,375 and 5,139,464 all relate to mechanisms for extending a telescoping antenna.

The subject matter of these prior U.S. patents is incorporated herein by reference.

The invention herein discusses methods and apparatus for preventing birds and other debris from doing damage to a jet engine using two types of deployable/protractible apparatus with acceptable aerodynamic features.

SUMMARY OF THE INVENTION

It is a principal object of the present invention to provide protection to an operating jet engine against airborne birds and other debris which may damage the engine.

It is a further object of the present invention to provide such protection using retractable apparatus, so that the aerodynamic consequences of such an apparatus are minimized, with respect to duration of use.

The invention herein discusses methods and apparatus for preventing birds and other debris from damaging a jet engine. It entails the deployment of a radially distributed set of first elements in front of the engine air intake. During the process of deployment, the leading edges of these first elements converge as they are extended from the engine housing. In order to prevent these first elements from suffering damage or malpositioning due to air turbulence, a second element, oriented transverse to the first elements, and positioned at the leading edge of the first elements, is also deployed. The second element features an adjustable circumference, allowing it to maintain the leading edges during the process of deployment, with the circumference changing as the length of the deployed portion of the first element changes.

The first elements are retractable into the housing of the engine, so that once the aircraft rises above the altitude where such a strike may occur, better aerodynamic performance may be attained. During the landing phase of the flight, the first elements may be re-deployed when the aircraft has descended to an altitude where such protection is needed.

There are a variety of possible first element configurations involving variations in (a) the shape of the first element (straight and curved), (b) the number of first elements, and (c) the structural details of the first elements (for example: rigid rod terminating in eyelet, rigid rod terminating in tubular structure, hollow rod terminating in T-shaped tubular structure, and cable terminating in eyelet).

There are a variety of possible second element configurations involving variations in (a) the quality of the second element material (elastic, spring, cable), and (b) the number of second elements.

In one preferred embodiment of the invention, electromagnetic coupling secures adjacent leading edges of first elements in the fully deployed state.

in another preferred embodiment, de-icing apparatus warms the first and/or second elements.

In yet another preferred embodiment, the entire deflector apparatus rotates about the longitudinal axis, to provide additional protection.

Another embodiment of the invention entails the deployment of elongate linear elements which are deployed across the air intake duct of the engine, oriented perpendicular to the longitudinal axis of the engine. In the retracted stated, these filter elements are moved to one or more sides of the intake duct, out of the incoming air stream. Guiding elements facilitate the deployment and retraction processes.

in a preferred embodiment of the invention, the elongate linear elements are a cable.

In another preferred embodiment of the invention more than one set of filter elements is deployed, with each set of elements having a different orientation.

In yet another preferred embodiment of the invention one or more sets of deflector elements rotates about a central longitudinal axis.

In yet another preferred embodiment of the invention a cleaning apparatus cleans the filter elements.

BRIEF DESCRIPTION OF THE DRAWINGS

FIG. 5A is a perspective view of a jet engine with a deployed deflector apparatus having multiple curved first elements and two transverse second elements.

FIG. 5B is a perspective view of a jet engine with a deployed deflector apparatus having multiple straight first elements and two transverse second elements.

FIG. 5C is a representational diagram of a jet engine indicating the storage of retracted first elements and two retracted second elements.

DESCRIPTION OF THE PREFERRED EMBODIMENT

Figure 1A:
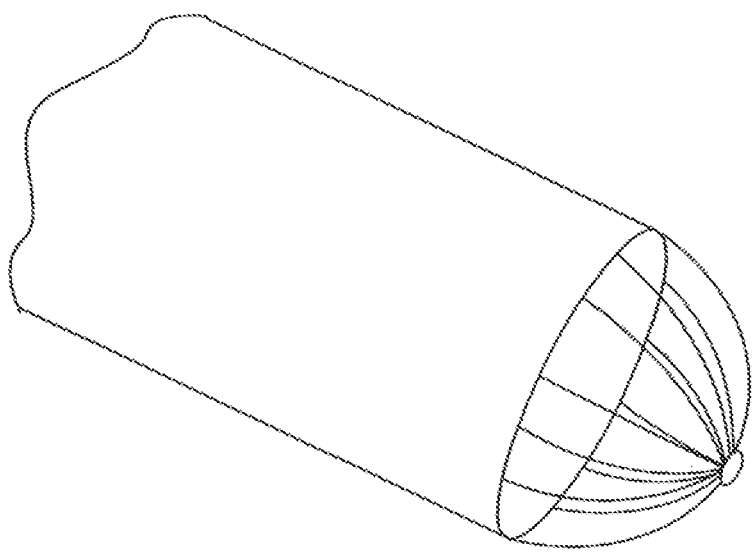
FIG. 1A is a perspective view of a jet engine with a deployed deflector apparatus having multiple curved first elements and a single transverse second element.
Figure 1B:
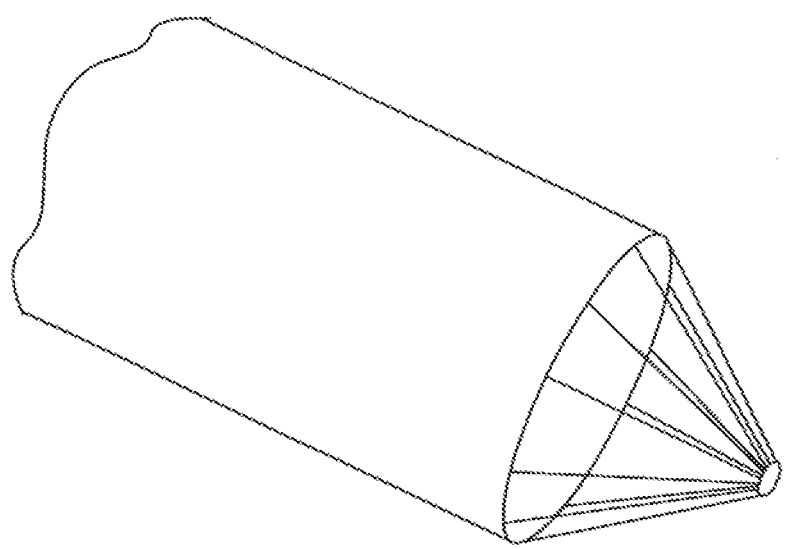
FIG. 1B is a perspective view of a jet engine with a deployed deflector apparatus having multiple straight first elements and a single transverse second element.

FIGS. 1A and 1B show two types of deflector apparatus for a jet engine. FIG. 1A shows 12 curved first elements 102 projecting from the air intake end of jet engine 100. FIG. 1B shows 11 straight first elements 104 projecting from the air intake end of jet engine 101. Many other configurations are possible. Both figures show first elements in a radially symmetric distribution. Configurations with a greater or lesser number of first elements are possible.

To stabilize the first elements during deployment, a second expandable element connects the leading end of the first elements, shown as 103 in FIGS. 1A and 105 in FIG. 1B.

Embodiments of the invention in which the first elements link at a point or a small area without an aperture (i.e. an opening at the most forward point) are possible. Embodiments of the invention in which the circular apparatus is substituted by an apparatus of another shape are possible. Elliptical shapes, hexagonal shapes, octagonal shapes, polygonal shapes (and any shape in which the number of sides to the central aperture is equal to the number of first elements) are possible. A shape which is identical to that of the engine housing, if not circular, is possible.

Figure 1C:
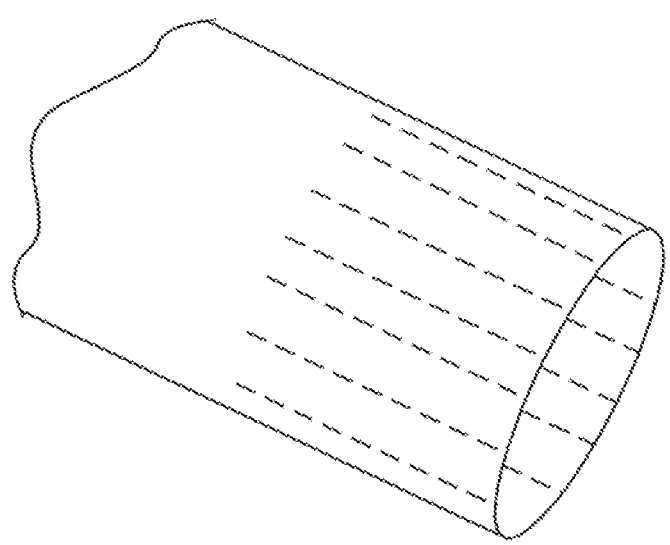
FIG. 1C is a representational diagram of a jet engine indicating the storage of retracted first elements and a retracted second element.

FIG. 1C shows the first elements 108 in the fully retracted position (indicated in the figure as broken lines) within the housing of engine 106. In the embodiment shown in FIG. 1C, the first elements in the retracted state are stored inside the engine housing, and are not telescoped. The configuration shown in FIG. 1C would be suitable for straight first elements, and could also be used for curved first elements with a large radius of curvature. Curved first elements with a smaller radius of curvature (i.e. approximately the same radius of curvature as the engine housing) could be stored by rotating them 90 degrees so that they would, in the stored state, lie along the circumference of the engine.

Figure 1D:
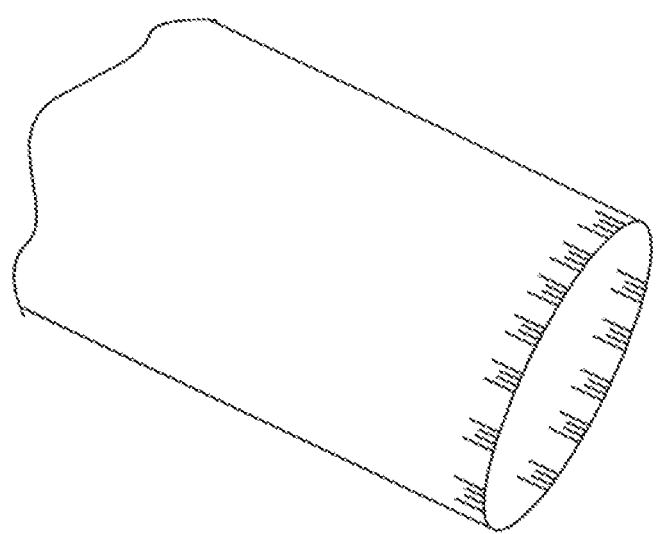
FIG. 1D is a representational diagram of a jet engine indicating the storage of telescoping first elements.

FIG. 1D shows the storage of telescoped first elements 110. The advantage of telescoping is ease of storage in the retracted state. The telescoped configuration for the retracted state shown in FIG. 1D could also accommodate curved first elements (e.g. as shown in FIGS. 3A and 3B) with a smaller radius of curvature (without having to rotate 90 degrees for storage) than that of the engine housing of FIG. 1C.

Figure 1E:
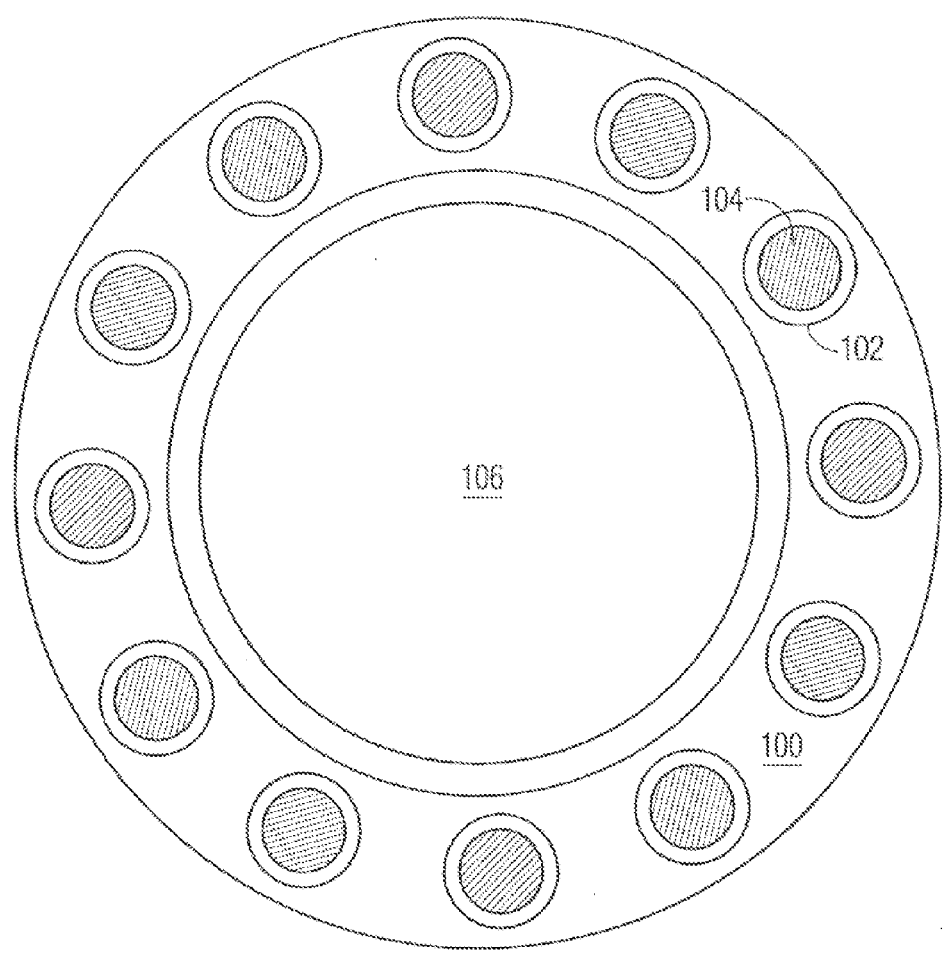
FIG. 1E is a front view of the placement of first elements within an engine housing.

FIG. 1E shows a front view of telescoped first elements 114 within compartments 112, situated in engine housing 118. The engine apparatus is situated centrally, in the location indicated by 116.

Figure 2A:
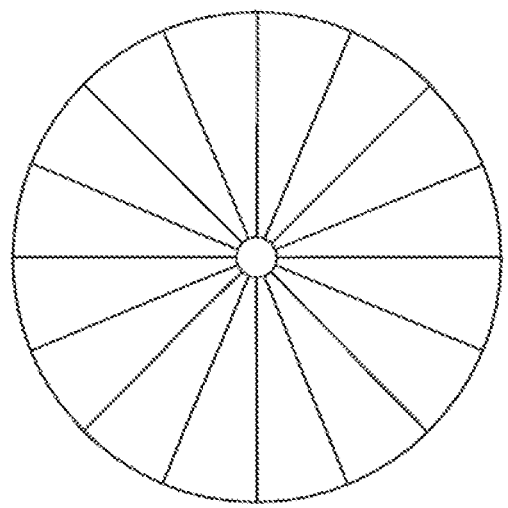
FIG. 2A is a representational diagram showing a front view of a fully deployed deflector apparatus with 16 first elements arrayed in a radially symmetric configuration, and a second element.
Figure 2B:
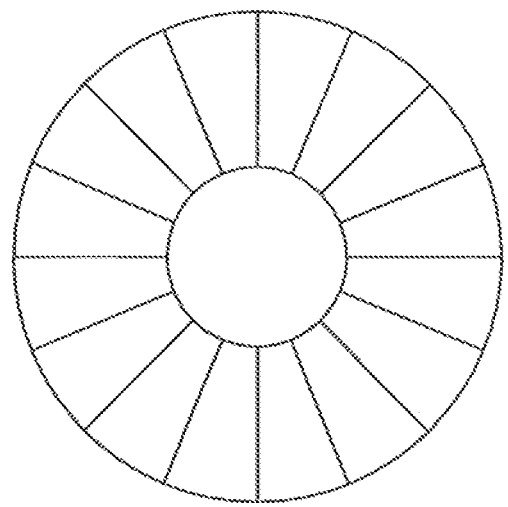
FIG. 2B is a representational diagram showing a front view of a partially deployed deflector apparatus with 16 first elements arrayed in a radially symmetric configuration, and a second element.
Figure 2C:
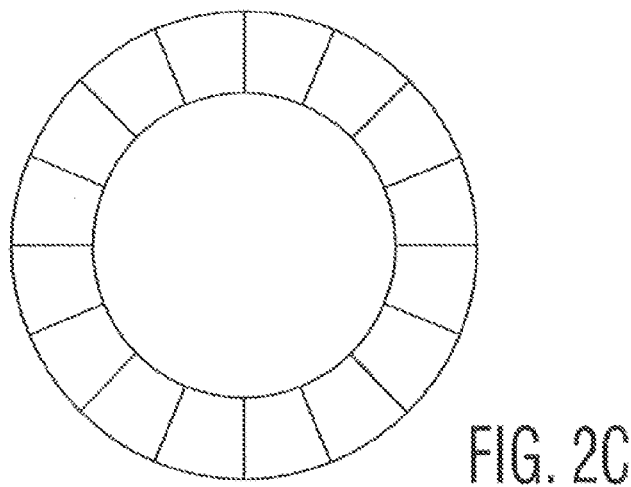
FIG. 2C is a representational diagram showing another front view of a partially deployed deflector apparatus with 16 first elements arrayed in a radially symmetric configuration, and a second element, showing a lesser degree of deployment than that shown in FIG. 2B.
Figure 2D:
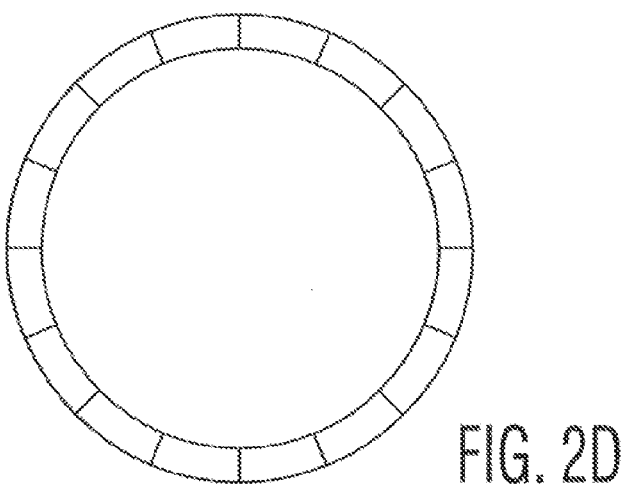
FIG. 2D is a representational diagram showing another front view of a partially deployed deflector apparatus with 16 first elements arrayed in a radially symmetric configuration, and a second element, showing a lesser degree of deployment than that shown in FIG. 2C.
Figure 2E:
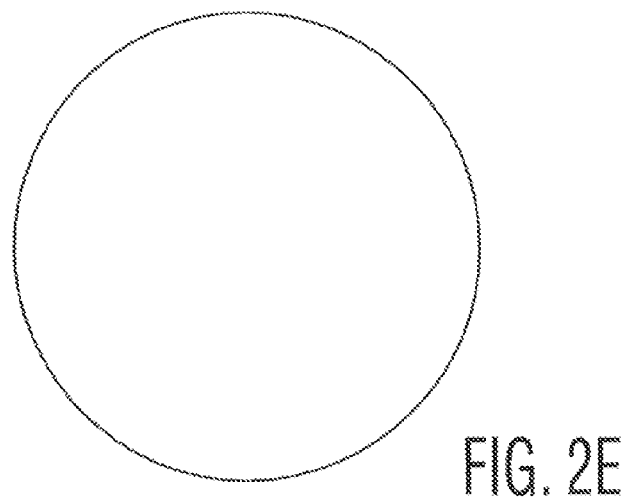
FIG. 2E is a representational diagram showing a front view of the deflector apparatus of FIG. 2D in a fully retracted state.

FIGS. 2A through 2E show front views of an engine with the first elements joined at the leading edge by a circular second element. During the deflector retraction process, the circular second element increases in circumference as shown in the sequence of FIGS. 2A to 2E. FIG. 2E shows the fully retracted state—where most or all of the first element apparatus has been withdrawn into the engine housing, as the radius of what was the central circular element is increased to the point that it equals approximately that of the engine housing. A 16 first element configuration is shown; configurations with fewer and larger numbers of first elements are possible.

Figure 3A:
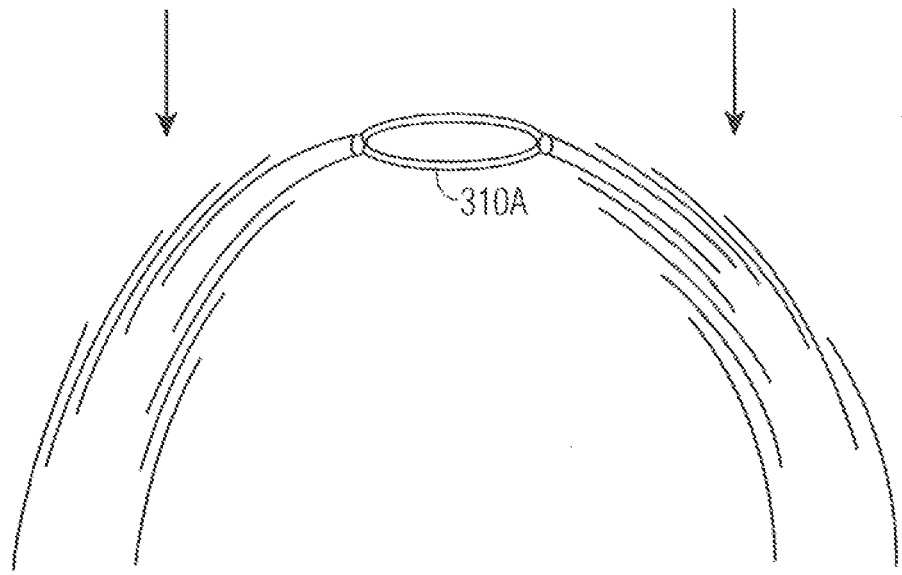
FIG. 3A shows a representational cross sectional diagram of a deflector apparatus with curved, telescoping first elements, and a second element, in a deployed position.
Figure 3B:
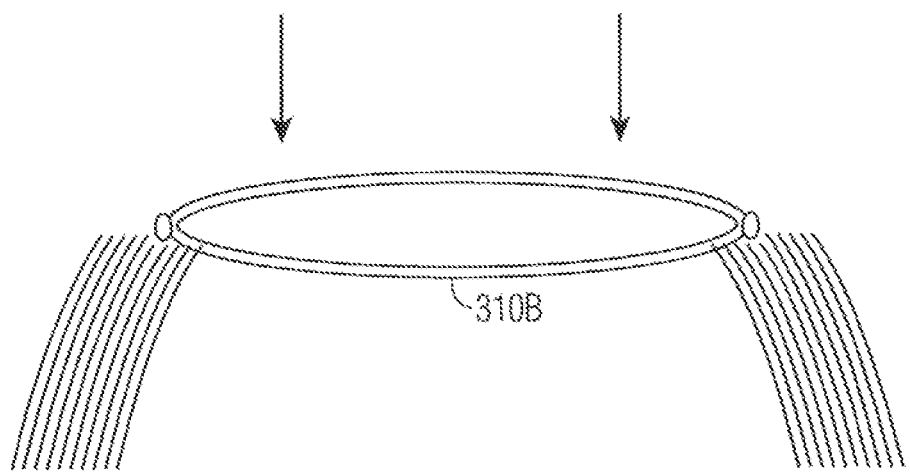
FIG. 3B shows a representational cross sectional diagram of a deflector apparatus with curved, telescoping first elements, and a second element, in a retracted position.

FIGS. 3 and 4 show a side view of an embodiment of the apparatus, emphasizing a first element structure with a telescoping configuration. FIG. 3 shows an apparatus with curved first elements, and FIG. 4 shows an apparatus with straight first elements. Each figure shows that the first element structure consists of a series of cylindrical elements with a telescoping structure, much like a retractable automobile antenna. FIG. 3A shows the first elements 300A fully extended, with circular stabilizing apparatus 310A assuming a minimal circumference. In the fully retracted state shown in FIG. 3B, the telescoping of concentric cylindrical first elements 300B allows the first elements to fit inside the engine housing, while the circular apparatus 310B expands (in a process described hereinbelow) so that it may also fit into the engine housing. Only two sets of first elements are shown for simplicity. Configurations with more sets of first elements are desirable to allow for greater stability and ease of retraction. Arrows above FIGS. 3A and 3B show the direction of air flow into the engine. Electrically controllable telescoping elements which are controlled by one or more electric motors, by hydraulic apparatus and by pneumatic apparatus are known.

Figure 4A:
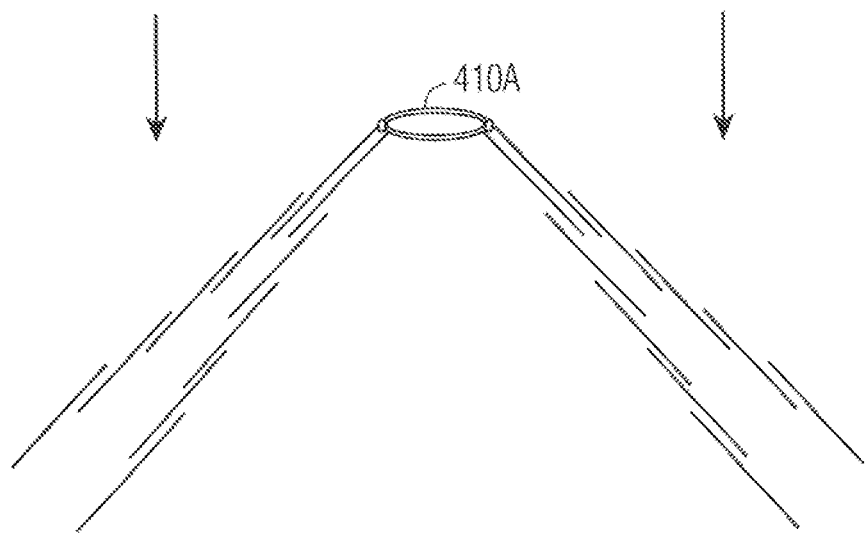
FIG. 4A shows a representational cross sectional diagram of a deflector apparatus with straight, telescoping first elements, and a second element, in a deployed position.
Figure 4B:
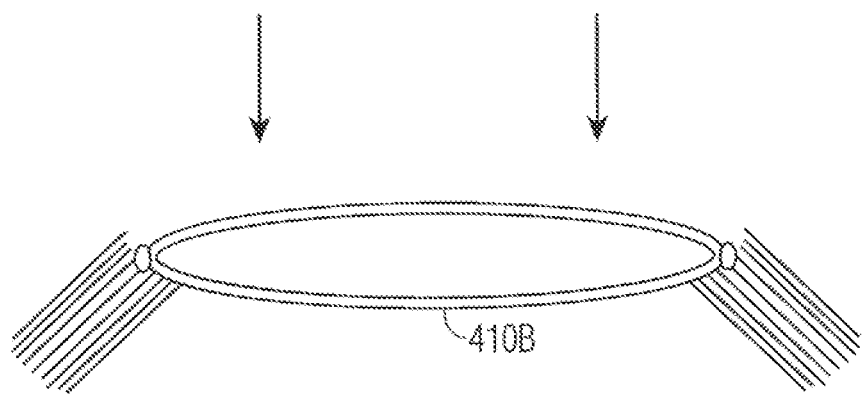
FIG. 4B shows a representational cross sectional diagram of a deflector apparatus with straight, telescoping first elements, and a second element, in a retracted position.

FIG. 4A shows the first elements 400A fully extended, with circular stabilizing apparatus 410A assuming a minimal circumference. In the fully retracted state shown in FIG. 4B, the telescoping of concentric cylindrical first elements 400B allows the first elements to fit inside the engine housing, while the circular apparatus 410B expands (in a process described hereinbelow) so that it may also fit into the engine housing. Only two sets of first elements are shown for simplicity. Configurations with more sets of first elements are desirable to allow for greater stability and ease of retraction. Arrows above FIGS. 4A and 4B show the direction of air flow into the engine.

Figure 5A:
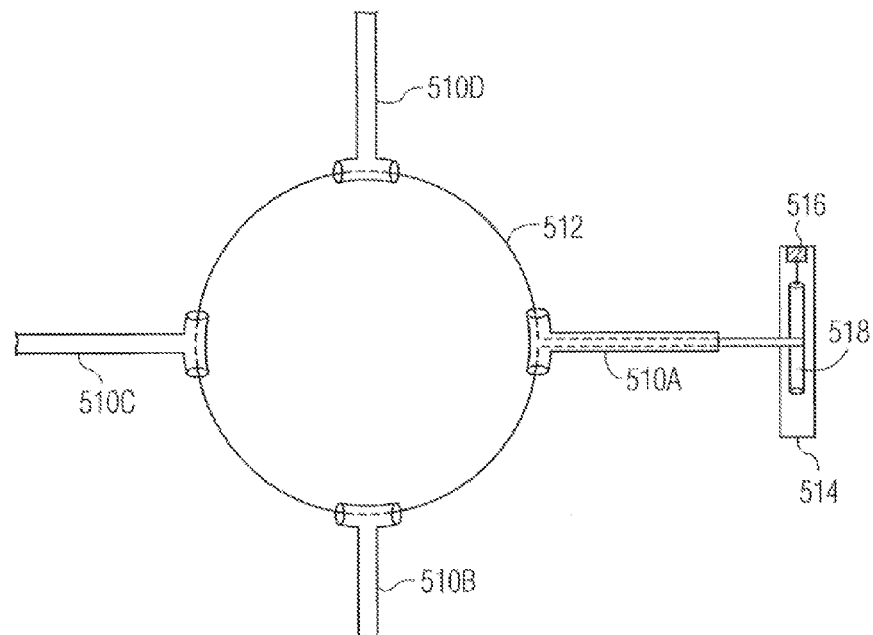
FIG. 5A shows a representation diagram of a deflector apparatus with four first elements, a second cable element, and a single winch for adjusting the length of the cable.
Figure 5B:
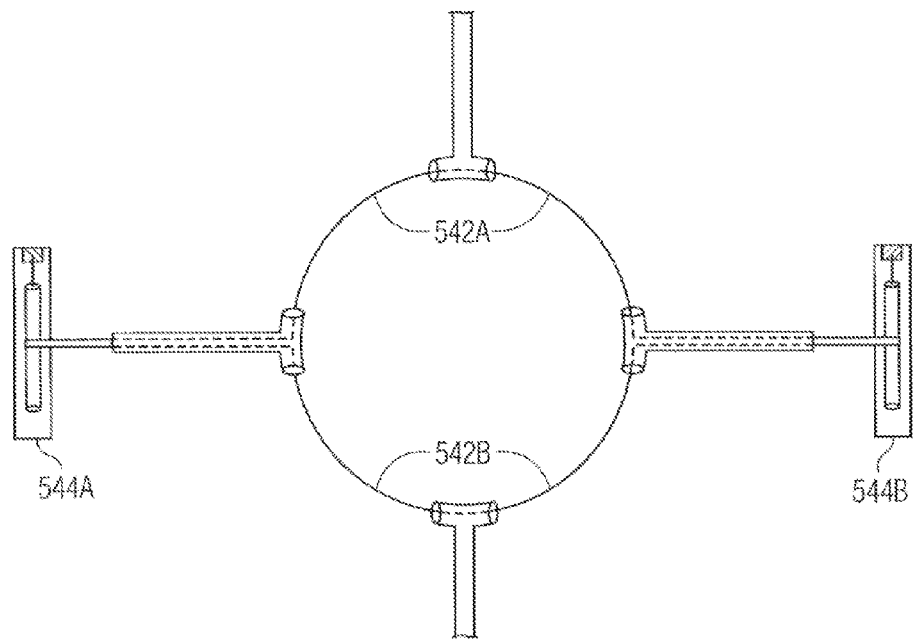
FIG. 5B shows a representation diagram of a deflector apparatus with four first elements, two second cable elements, and two winches for adjusting the length of the cables.
Figure 5C:
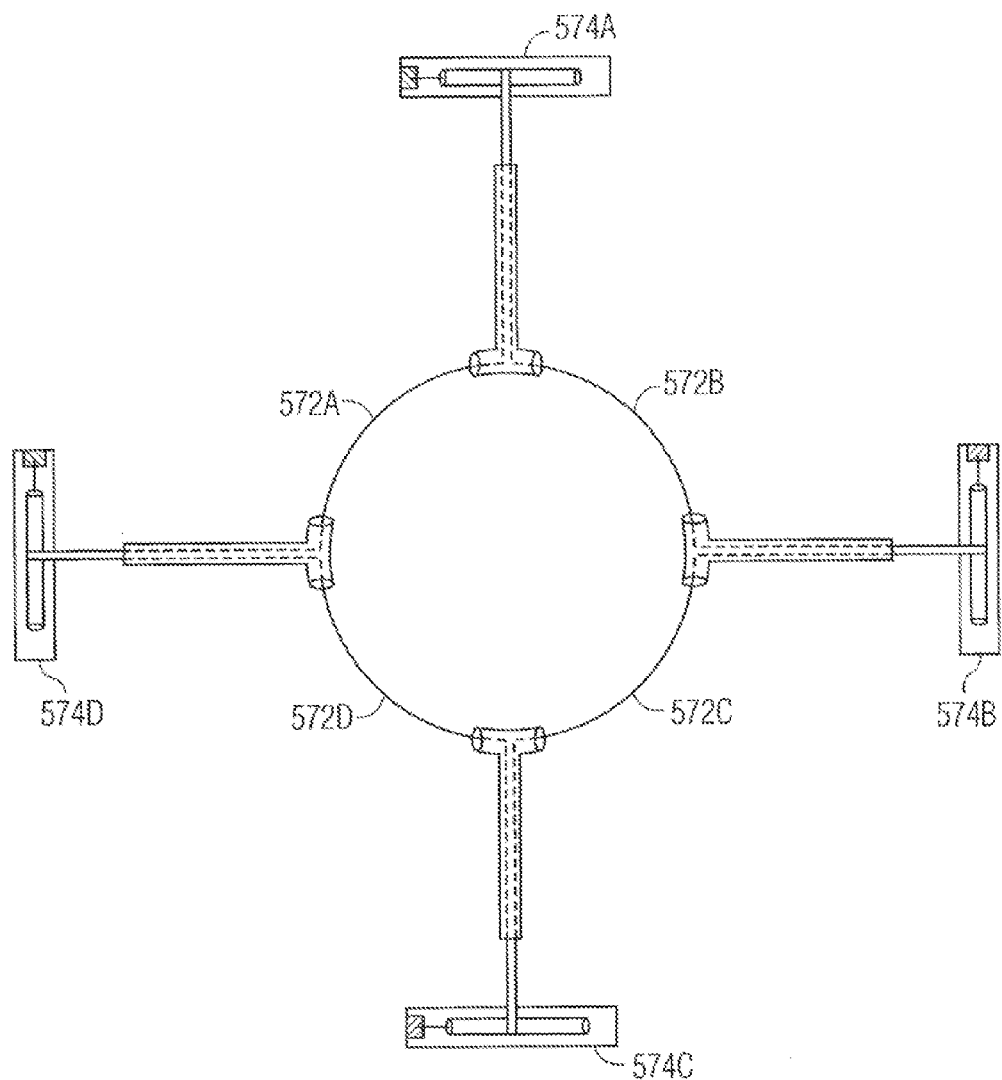
FIG. 5C shows a representation diagram of a deflector apparatus with four first elements, four second cable elements, and four winches for adjusting the length of the cables.

FIGS. 5A-5C show a possible structure for controlling the configuration of the second element. Apparatus with only four first elements is shown for ease of interpretation. Referring to FIG. 5A, as first elements 510A-D are retracted (by movement which is radially outward in the figure), cable 512, the second element, is gradually unspooled from spool 518 by motorized apparatus 516 in housing 514, (The segment; of cable which lies between each of 510A/B, 510B/C, 510C/D and 510D/A is shown in a curved configuration, which would be the conceptual limiting case with an infinite number of first elements; In the case of a large number of first elements, a many-sided polygon would approximate the circle shown in the figure.) As shown in the figure, the terminal segment of each radial arm forms a curved cylindrical shape which allows the cable to pass through. When the first elements go from the retracted state to the deployed state, motor 516 causes cylinder 518 to take up cable slack as it becomes available. Embodiments of the invention in which 512 is a spring apparatus (see hereinbelow) are possible.

FIG. 5S shows an apparatus similar to that of 5A, except that there are two cables, 542A and 542B. The slack for one end of each of 542A and 542B is controlled by slack uptake and release apparatus 544A and 544B (each of which operate in similar fashion to that of 514).

FIG. 5C shows an apparatus similar to that of FIGS. 5A and 5B except that there is one cable segment (572A-D) for each pair of adjacent retractable arms, and one slack uptake and release apparatus (574A-D) for one end of each pair of adjacent cable ends. For example, when the apparatus in FIG. 5C goes from the deployed to the retracted state:

574A unrolls appropriate portions of one end of cable 572A and one end of cable 572B; 574B unrolls appropriate portions of one end of cable 572B and one end of cable 572C;

574C unrolls appropriate portions of one end of cable 572C and one end of cable 572D; and 574D unrolls appropriate portions of one end of cable 572D and one end of cable 572A.

Figure 5D:
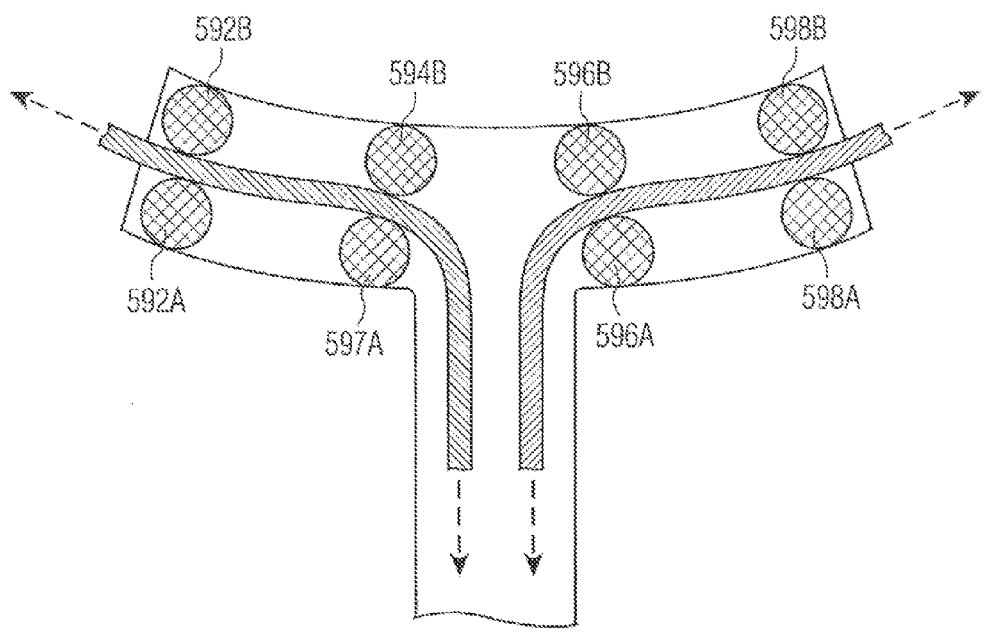
FIG. 5D shows a representational diagram of a T-shaped leading end of a first element, showing apparatus to decrease the friction due to motion of a cable.

Configurations of the invention with various friction reducing elements are possible. FIG. 5D shows a representational cross sectional view of the terminal protuberance of a first element in one embodiment of the invention. In order to minimize friction between the cable and the first element, one or more of friction reducing elements 592A, 592B, 594A, 594B, 596A, 596B, 598A, and 598B are included. These may be flat rolling elements, or grooved wheels. In another embodiment of the invention, 592A and B may be considered to be a cross-sectional representation of a circular bearing device which guides the cable with minimal friction; the same is true of the 594A and B pair, the 596A and B pair and the 598A and B pair. Embodiments of the invention with either a greater or lesser number of guiding elements are possible. Embodiments of the invention in which the friction-reducing elements are actively lubricated, or are self-lubricating are possible. Many other friction reducing configurations will be apparent to those skilled in the art.

Figure 6A:
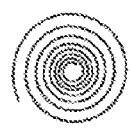
FIG. 6A is a representational diagram showing a coiled second element, in a configuration corresponding to a fully deployed state.
Figure 6B:
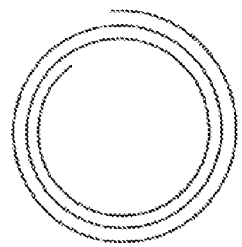
FIG. 6B is a representational diagram showing a coiled second element, in a configuration corresponding to a partially deployed state.
Figure 6C:
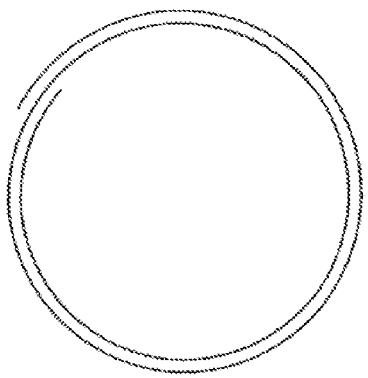
FIG. 6C is a representational diagram showing a coiled second element, in a configuration corresponding to a partially deployed state, showing a lesser degree of deployment than that of FIG. 6B.
Figure 6D:
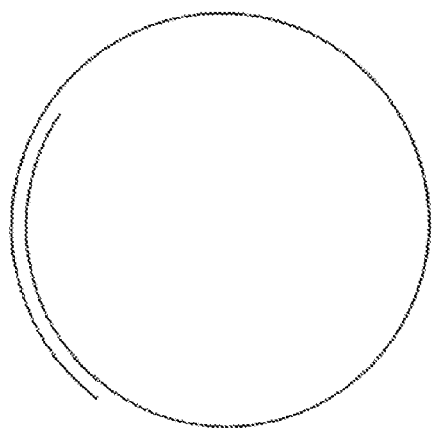
FIG. 6D is a representational diagram showing a coiled second element, in a configuration corresponding to a partially deployed state, showing a lesser degree of deployment than that of FIG. 6C.
Figure 6E:
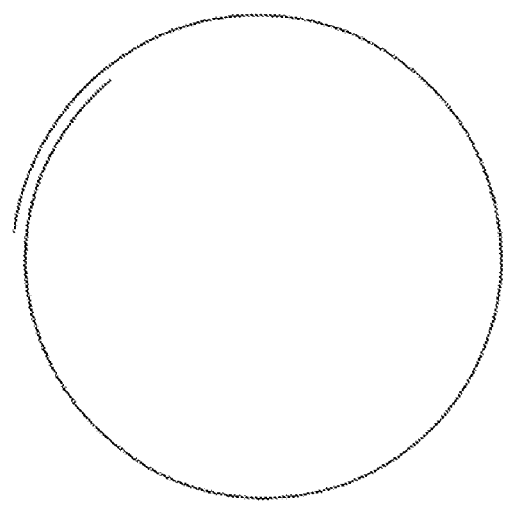
FIG. 6E is a representational diagram showing a coiled second element, in a configuration corresponding to a fully retracted state.

FIGS. 6A to 6E, shows a circular spring apparatus which provides the attractive force between adjacent distal ends of the first elements when they are deployed. FIGS. 6A to 6E correspond, respectively to the states of deployment/retraction shown in FIGS. 2A to 2E, i.e., five states ranging from first elements fully deployed (FIG. 6A) to first elements fully retracted (FIG. 6E).

Figure 7A:
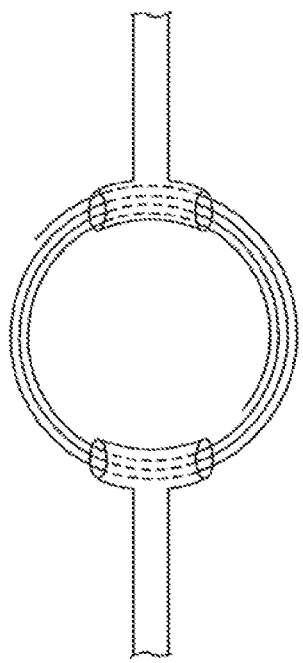
FIG. 7A is a representational diagram showing a coiled second element passing through the leading edge of each of two T-shaped first elements, in a deployed configuration.
Figure 7B:
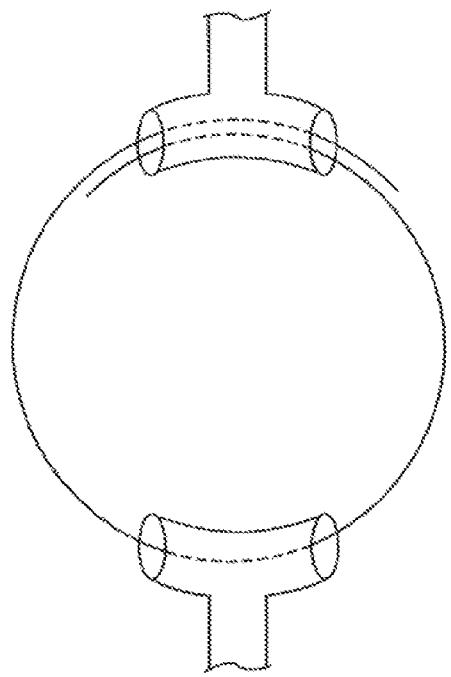
FIG. 7B is a representational diagram showing a coiled second element passing through the leading edge of each of two T-shaped first elements, in a retracted configuration.

FIG. 7, consisting of FIGS. 7A and 7B shows the circular spring apparatus of FIG. 6 in conjunction with first elements in two different states of ret reaction/deployment:

FIG. 7A corresponds to FIGS. 2B and 6B; while

FIG. 7B corresponds to FIGS. 2D and 6D.

Embodiments of the spring apparatus shown in FIGS. 6 and 7 in which one end of the spring is anchored to a first element are possible.

Figure 8A:
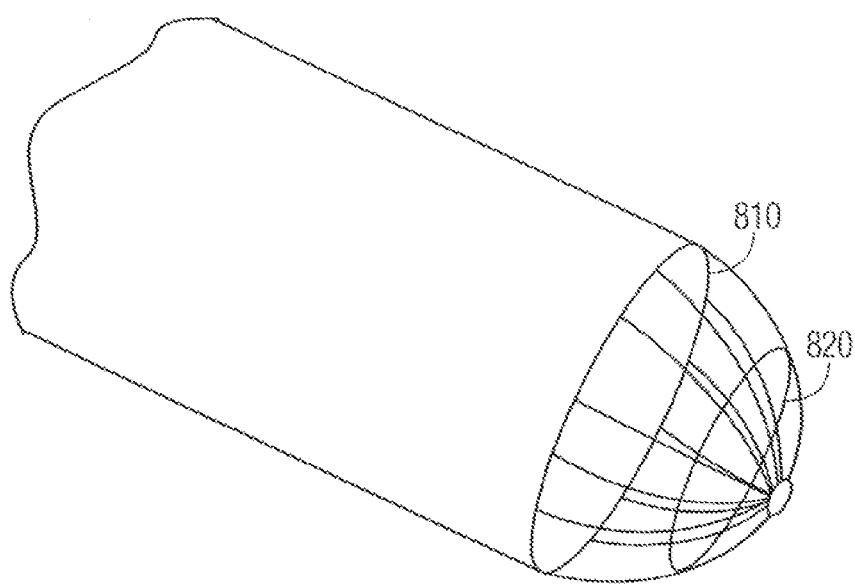
Figure 8B:
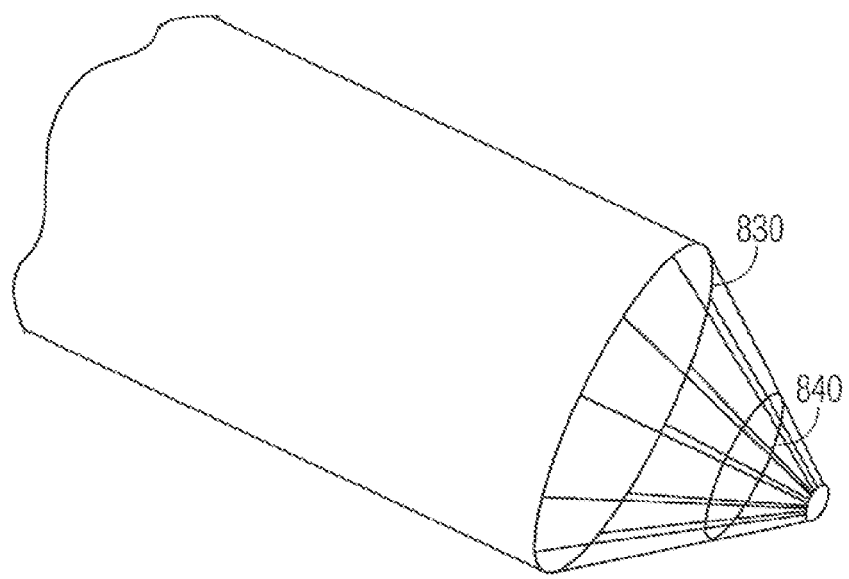
Figure 8C:
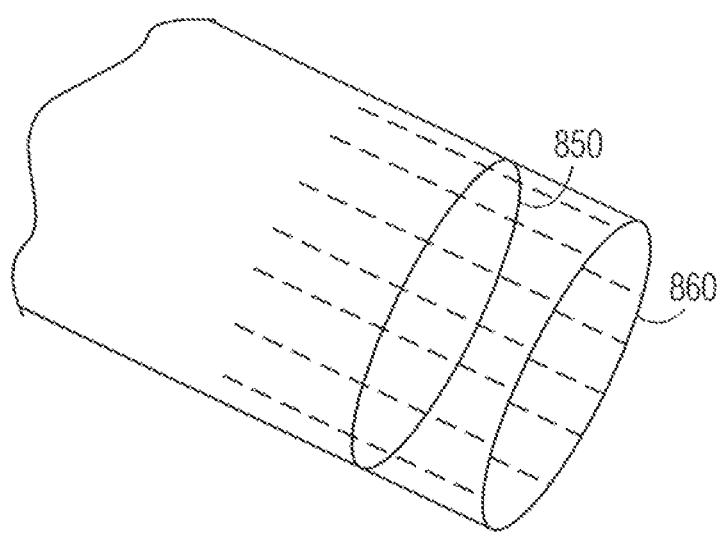

FIGS. 8A and 8B (analogous to FIGS. 1A and 1B respectively) show a configuration of the apparatus in which there are two transverse/second element supporting apparatus structures (810 and 820 for engine 815 in FIG. 8A, and 830 and 840 for engine 835 in FIG. 8B). The mode of operation of the transverse apparatus shown in each of the two figures is similar to that of the configurations with one transverse supporting apparatus, i.e. in the case of two such apparatus, each is retractable as shown by 850 and 860 in FIG. 5C. In FIG. 5C, the engine is indicated by 855 and the first support elements are indicated by broken lines 870.

FIGS. 9A-9E (each showing two circular second elements) are analogous to FIGS. 2A-2E (each showing one circular second element). As indicated hereinabove, in many configurations the circle representing the second element in the figure represents the theoretical upper limit of a many-sided polygon.

Figure 9A:
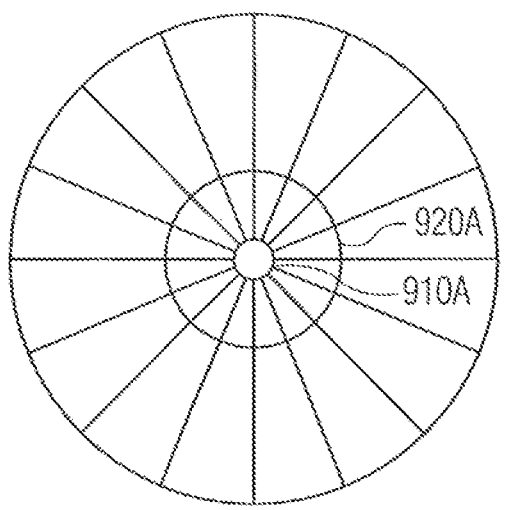
FIG. 9A is a representational diagram showing a front view of a fully deployed deflector apparatus with 16 first elements arrayed in a radially symmetric configuration, and two second elements.
Figure 9B:
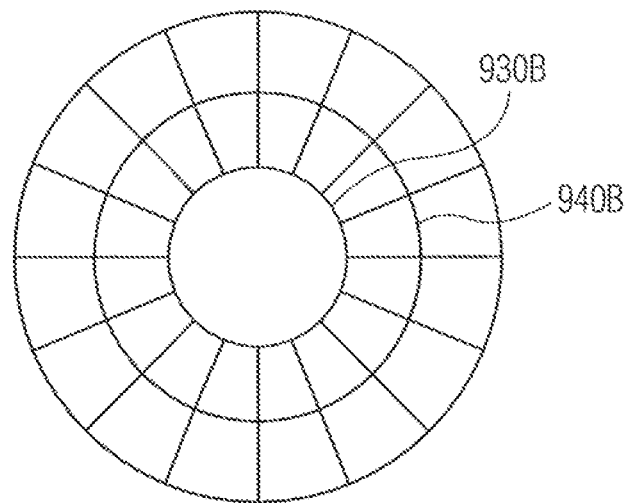
FIG. 9B is a representational diagram showing a front view of a partially deployed deflector apparatus with 16 first elements arrayed in a radially symmetric configuration, and two second elements.
Figure 9C:
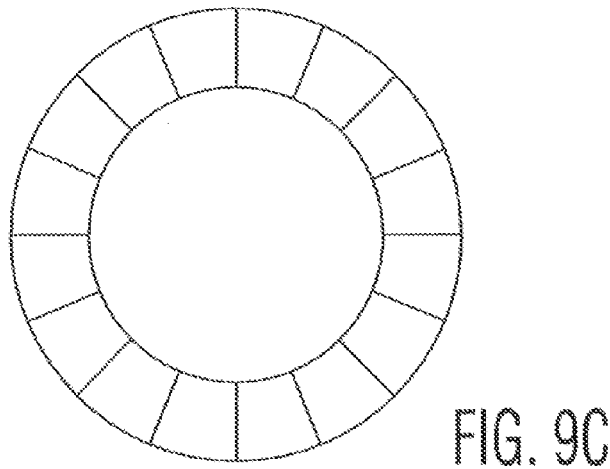
FIG. 9C is a representational diagram showing another front view of a partially deployed deflector apparatus with 16 first elements arrayed in a radially symmetric configuration, and two second elements, showing a lesser degree of deployment than that shown in FIG. 9B.
Figure 9D:
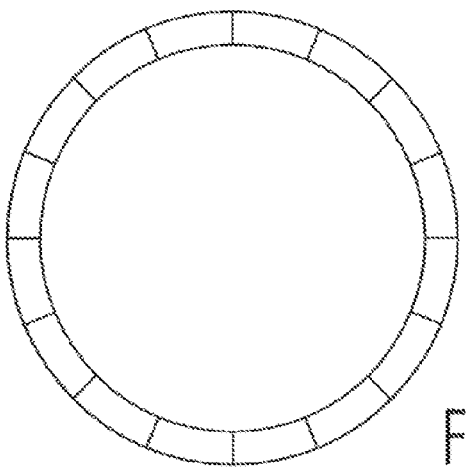
FIG. 9D is a representational diagram showing another front view of a partially deployed deflector apparatus with 16 first elements arrayed in a radially symmetric configuration, and two second elements, showing a lesser degree of deployment than that shown in FIG. 9C.
Figure 9E:
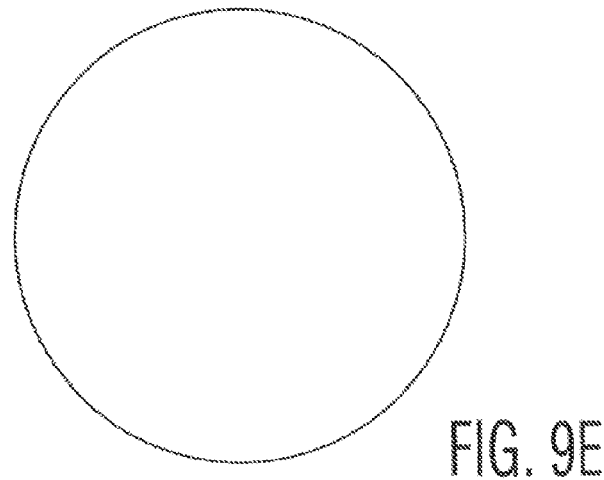
FIG. 9E is a representational diagram showing a front view of the deflector apparatus of FIG. 9D in a fully retracted state.

In FIG. 9A, the fully deployed configuration, the distal (i.e., nearest to the leading end) circular apparatus is 910A and the proximal (i.e. nearest to the trailing edge) one is 920A. In FIG. 9B, the partially retracted configuration, the distal circular apparatus is 930B and the proximal one is 940B. In FIGS. 9C-E, the proximal circular apparatus is retracted within the engine housing, so the appearance is identical to FIGS. 2C-2E, respectively.

Figure 10A:
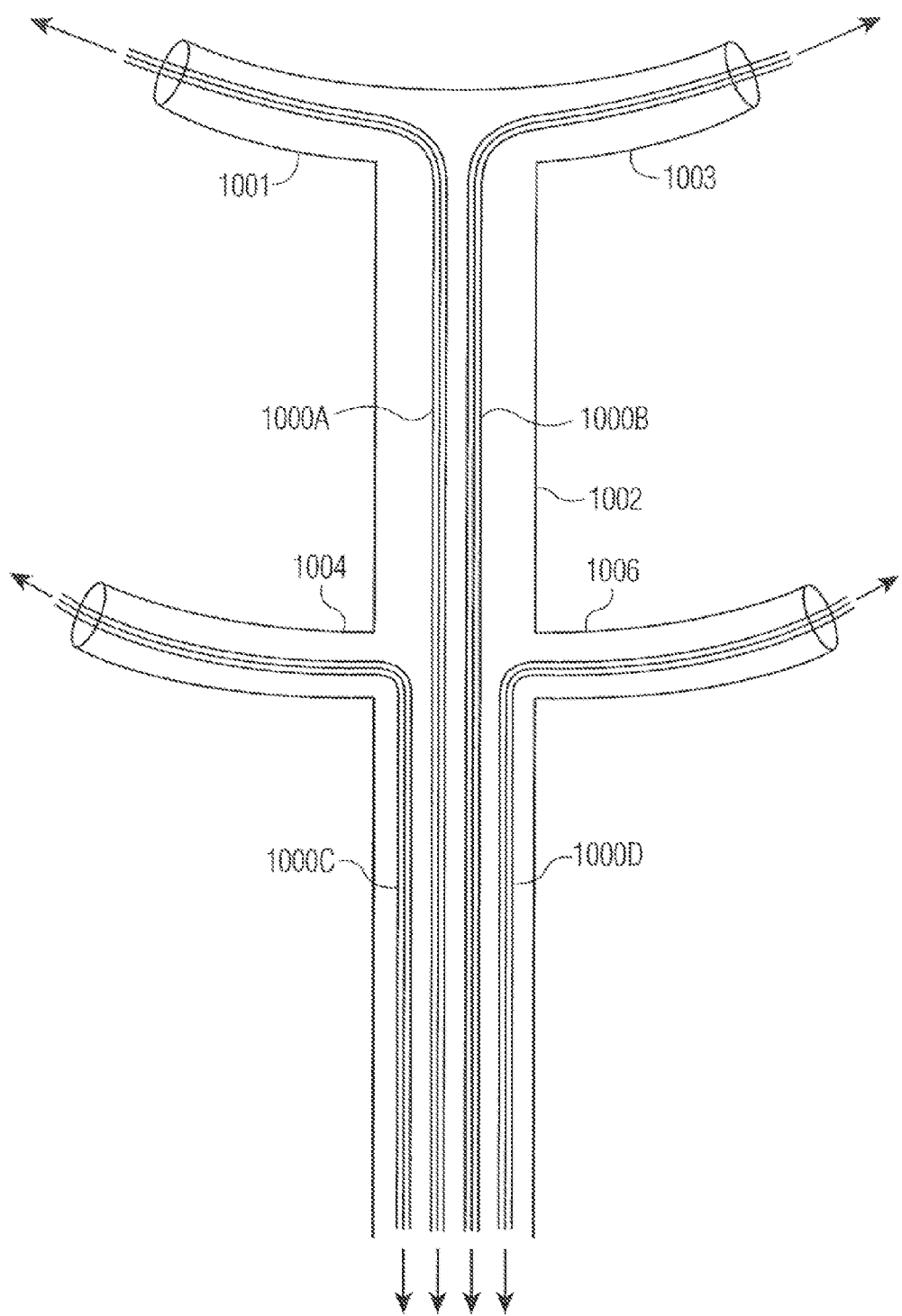
FIG. 10A is a representational diagram showing a cross sectional view of a tubular T-shaped first element, with projections forming two pairs of second elements, containing cables.

FIG. 10A shows a representational view of a complex first element for a configuration with one distal transverse supporting apparatus and one transverse supporting apparatus in the mid-portion of the first element. In principle, such a complex element has features of both a first element (i.e. as it exits the engine housing, one section extends longitudinally) and a second element (has projections which, as they exit the housing, extend in a direction transverse to the longitudinal section). The entire apparatus of FIG. 10A is analogous to element 510A in FIG. 5A (which is a first element without a transverse supporting apparatus in its midportion). Referring again to FIG. 10A, cables 1000A and 1000B help to align and hold together the distal ends of the complex first elements; They are analogous to any of [a] 512 in FIG. 5A; [b] 542A and 542 in FIG. 5B; and [c] any of (i) 572A and 572B, (ii) 572B and 572C, (iii) 572C and 572D, and (iv) 572D and 572A in FIG. 5C. In addition, cables 10000 and 1000D serve to anchor the midportion of each complex first element.

When the apparatus in FIG. 10A is utilized in a configuration analogous to that of FIG. 5C (i.e. an array of four of complex first element 1002), each cable segment analogous to 1000C in FIG. 10A extends to the neighboring first element to the left (see FIG. 10B), enters its main shaft, and comprises the segment analogous to 1000D in that left neighboring first element. Similarly, each cable segment analogous to 1000D in FIG. 10A extends to the neighboring first element to the right (see FIG. 10B), enters its main shaft, and comprises the segment analogous to 1000C in that right neighboring first element.

In a configuration analogous to that of FIG. 5A, the cable segment 1000C would extend from shaft 1002, out through projection 1004, and thence through the midportion of each first element (via projections analogous to each of 1004 and 1006), and ultimately return to first complex element 1002 via projection 1006 to form cable segment 1000D.

In configurations analogous to that shown in FIG. 5B, the cable segment 1000C would extend from shaft 1002, out through projection 1004, through the midportions of two or more adjacent first elements, each first element (via projections analogous to each of 1004 and 1006), and ultimately enter another first element via a projection analogous to 1006, and form a cable segment analogous to segment 1000D in another first element.

In configurations analogous to that of FIG. 5B, the cables within first elements traversed by transverse cable segment must be geometrically set up so that the transverse segment does not contact longitudinal segments analogous to 1000A and 1000B. Although FIG. 10A shows all four cable segments lying in the same plane (i.e. the plane of the figure), in three dimensions, the transverse segment could cross through the shaft either so that it does not contact either of the segments analogous to 1000A or 1000B (i.e. by crossing above or below the plane defined by 1000A and 1000B).

The advantage of projections 1004 and 1006 is that they help guide and secure the transverse cable in the midportion of the first element, and allow for a locking mechanism to further stabilize the apparatus. The disadvantage is that they add weight, they further restrict the open area in front of the engine, and they make retraction of the first element more complex. Embodiments of the invention in which each of projections 1004 and 1006 are absent, replaced by respective openings in the shaft of 1002 to accommodate respective cables 1000C and 10000 are possible.

Though FIG. 10A shows projections 1004 and 1006 to be in the midportion of the first element, configurations are possible in which the junction is asymmetrically located, either proximally (i.e. nearer to the engine housing) or nearer to the distal end of the apparatus.

The proximal ends of each of 1000C and 1000D are linked to cable control apparatus which appropriately releases or takes in cable, as the situation may require. Such cable control apparatus is analogous to any of [a] 514, 516 and 518 shown in FIG. 5A; [b] 544A and 544B shown in FIG. 5B; and [c] 574A, 574B, 574C and 574D shown in FIG. 5C.

Cables may be secured within 1002 by a variety of means and mechanisms including:
a) situating the cable within a non-moving sheath; b) grooves within 1002 for each cable; and/or c) one or more guiding wheels, rollers, or bearings along the length of the cable within 1001, 1002, 1003, 1004 and/or 1006, analogous to that which is shown herein in conjunction with FIG. 5D.

Figure 10B:
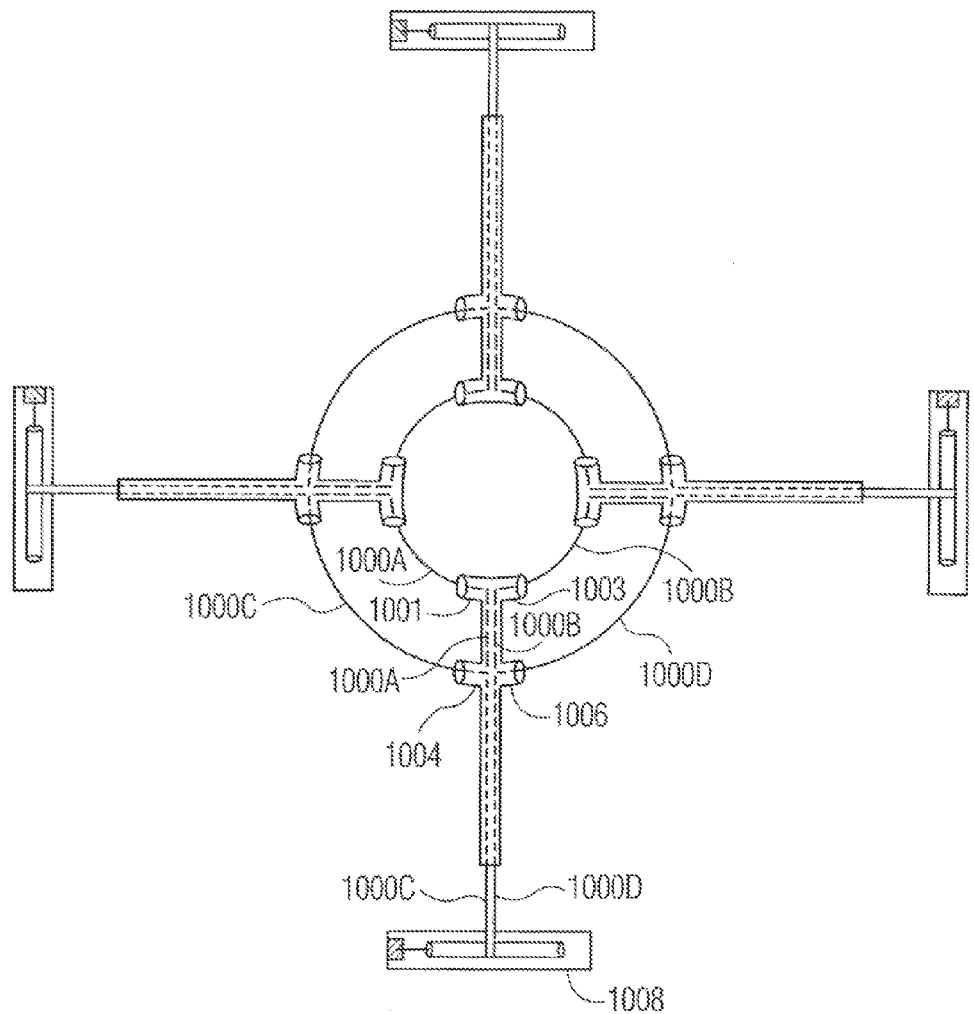
FIG. 10B shows a representation diagram of a deflector apparatus with four first elements, four second cable elements each located at the leading edge of the first elements, four additional second cable elements each located between the leading edge and the trailing edge of the first elements, and four winches for adjusting the length of the additional cables elements.

FIG. 10B shows a deflector which includes an array of four of the complex first elements shown in FIG. 10A. The apparatus shown in the figure is analogous to that shown in FIG. 5C. However, the apparatus in FIG. 10B includes an additional transverse support group of structures. Cable take-up apparatus 1008 controls the length of cable segment 10000, which passes through 1002, exits through projection 1006 and enters the corresponding structure on the right side of the figure. Similarly, cable take-up apparatus 1008 controls the length of cable segment 1000C, which passes through 1002, exits through projection 1004 and enters the corresponding structure on the left side of the figure. The operation of 1008 and associated components is similar to that of 574A-D in FIG. 5C. These aforementioned structures link the midsection (which need not be located at the geometric middle) of the complex first elements (e.g. 1002).

The cable segments which forms the distal second element exit through projection 1003 as 1000B, and then enters the corresponding structure indicated by elements on the right side of the figure; Another cable segment which forms the distal second element exit through projection 1001 as 1000A, and then enters the corresponding structure indicated by elements on the left side of the figure.

The four cable take-up apparatus for the distal second elements is not shown in the figure, but is similar to that of 100.8, and 574A-D. Long broken lines in the figure indicate cable for the distal/leading edge second elements which are contained within 1002. Although these cable segments extend into the proximal shaft of 1002 (as shown in FIG. 10A), these segments of cable are not shown in the figure, for clarity. Short broken lines indicate cable for the proximal/midportion second elements, which are shown in their full extent.

Figure 10C:
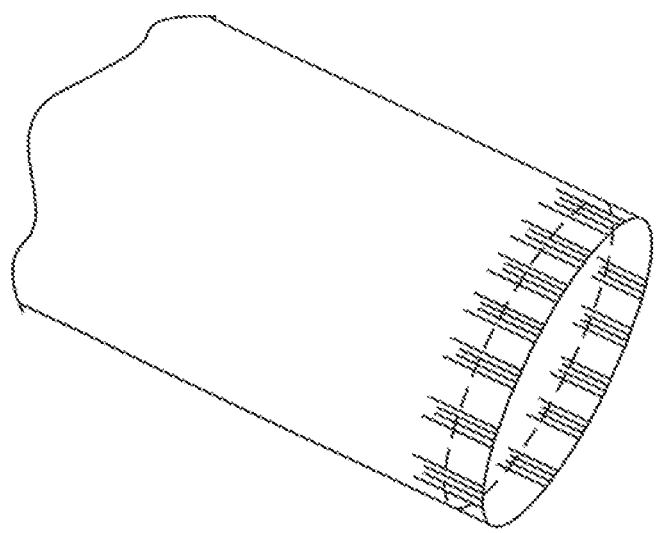
FIG. 10C is a representational diagram of a jet engine indicating the storage of retracted first elements and two retracted second elements.

FIG. 10C, analogous to FIG. 1D, shows a representational view of the retracted state, of an embodiment with (a) one transverse stabilizing cable 1020 in its midportion, and (b) collapsible/telescoping first elements 1022. With embodiments of the invention with lateral protuberances in the midsection, there will be a limitation to the collapse above and below such midsection protuberances. An embodiment of the invention is also possible in which the midsection protuberances themselves are able to collapse/telescope.

The telescoped configuration for the retracted state shown in FIG. 10C could also accommodate curved first elements (e.g. as shown in FIGS. 3A and 3B), as discussed hereinabove in conjunction with FIG. 1D.

Figure 11A:
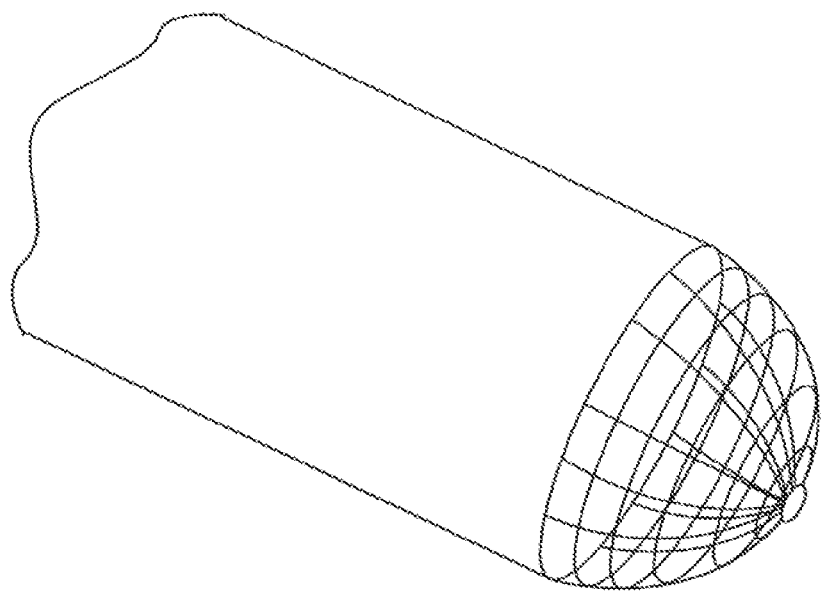
FIG. 11A is a perspective view of a jet engine with a deployed deflector apparatus having multiple curved first elements and six transverse second elements.
Figure 11B:
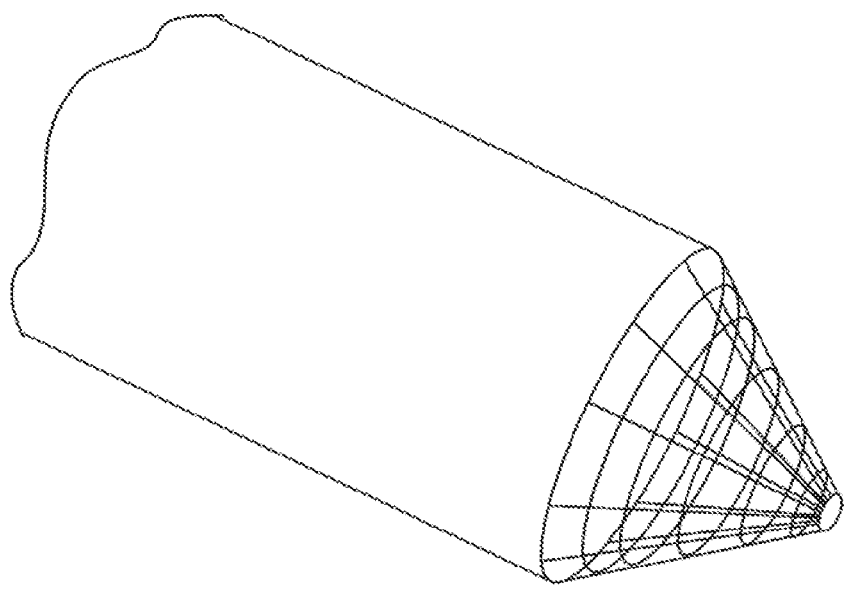
FIG. 11B is a perspective view of a jet engine with a deployed deflector apparatus having multiple straight first elements and six transverse second elements.

Whereas the aforementioned embodiments contain either no transverse elements along the first elements, or one such element (FIGS. 5A to 9E), FIG. 11A shows a configuration with 5 transverse elements and curved first elements (analogous to FIGS. 1A and 8A) and FIG. 11B shows a configuration with 5 transverse elements and straight first elements (analogous to FIGS. 1B and 8B). Configurations with greater and lesser numbers of first elements are possible. More first elements result in a greater degree of first element stability and the ability to limit the maximum size of an object which may cross the barrier resulting from the deployment of the apparatus described herein. On the other hand, more first elements result in greater weight, greater resistance to air entry and more complex cable arrangements within first elements and more complex cable supporting apparatus.

Figure 12A:
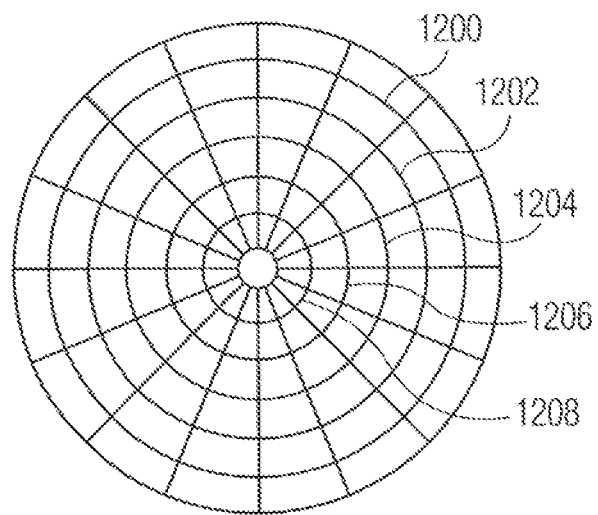
FIG. 12A is a representational diagram showing a front view of a fully deployed deflector apparatus with 16 first elements arrayed in a radially symmetric configuration, and six second elements.
Figure 12B:
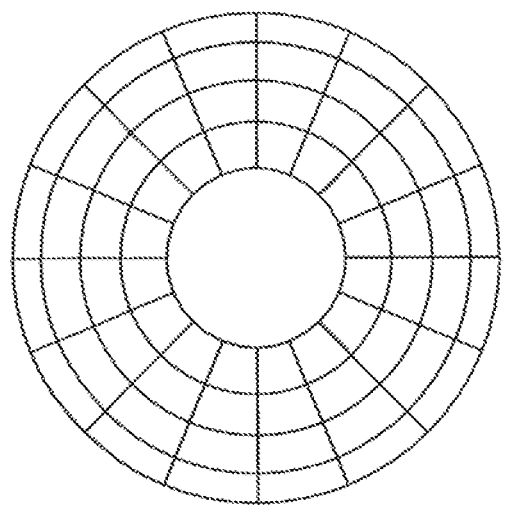
FIG. 12B is a representational diagram showing a front view of a partially deployed deflector apparatus with 16 first elements arrayed in a radially symmetric configuration, and six second elements.
Figure 12C:
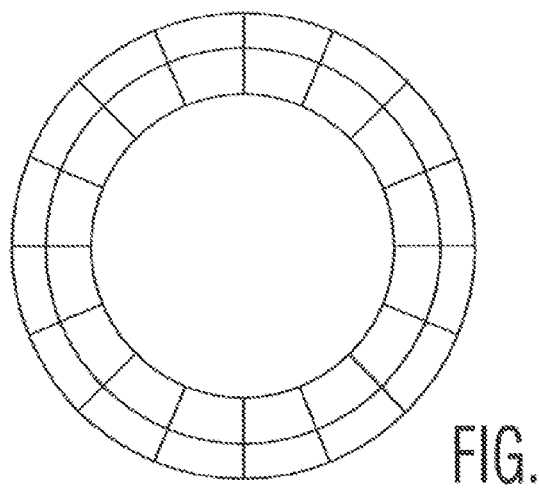
FIG. 12C is a representational diagram showing another front view of a partially deployed deflector apparatus with 16 first elements arrayed in a radially symmetric configuration, and six second elements, showing a lesser degree of deployment than that shown in FIG. 12B.
Figure 12D:
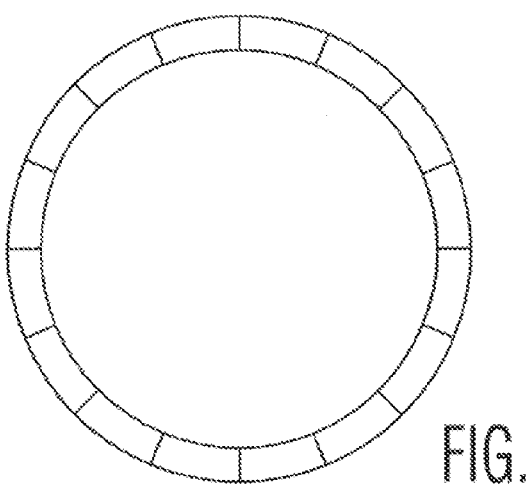
FIG. 12D is a representational diagram showing another front view of a partially deployed deflector apparatus with 16 first elements arrayed in a radially symmetric configuration, and six second elements, showing a lesser degree of deployment than that shown in FIG. 12C.
Figure 12E:
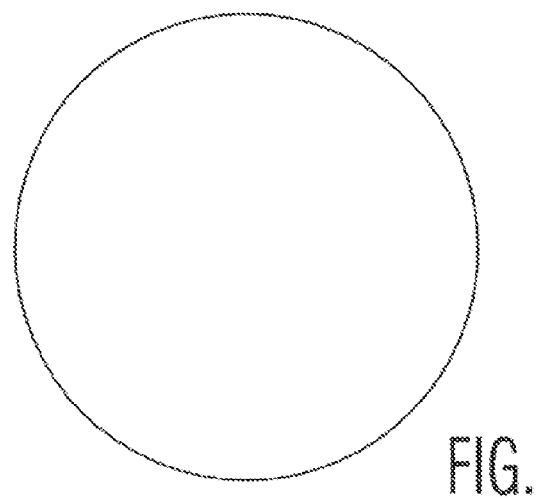
FIG. 12E is a representational diagram showing a front view of the deflector apparatus of FIG. 12D in a fully retracted state.

FIGS. 12A-12E—analogous to FIGS. 2A-2E and 9A-9E—show a front view of some of the successive steps in the transition from a fully deployed apparatus (FIG. 12A) to a fully retracted one (FIG. 12E) for a configuration with five transverse elements, 1200, 1202, 1204, 1206 and 1208 (in addition to the distal transverse support common to all of the configurations hereinabove). FIG. 12B shows a state in which two of the five transverse elements have been retracted (and in which the non-retracted transverse elements and the distal supporting apparatus have each (i) been pulled back and (ii) undergone an increase in radius). FIG. 12C shows a state in which four of the five transverse elements have been retracted (and in which the one remaining non-retracted transverse element and the distal supporting apparatus have each (i) been further pulled back and (ii) undergone a further increase in radius). FIG. 12D shows a state in which all of the five transverse elements have been retracted (and in which the remaining non-retracted distal supporting apparatus has (i) been still further pulled back and (ii) undergone a still further increase in radius).

Figure 13:
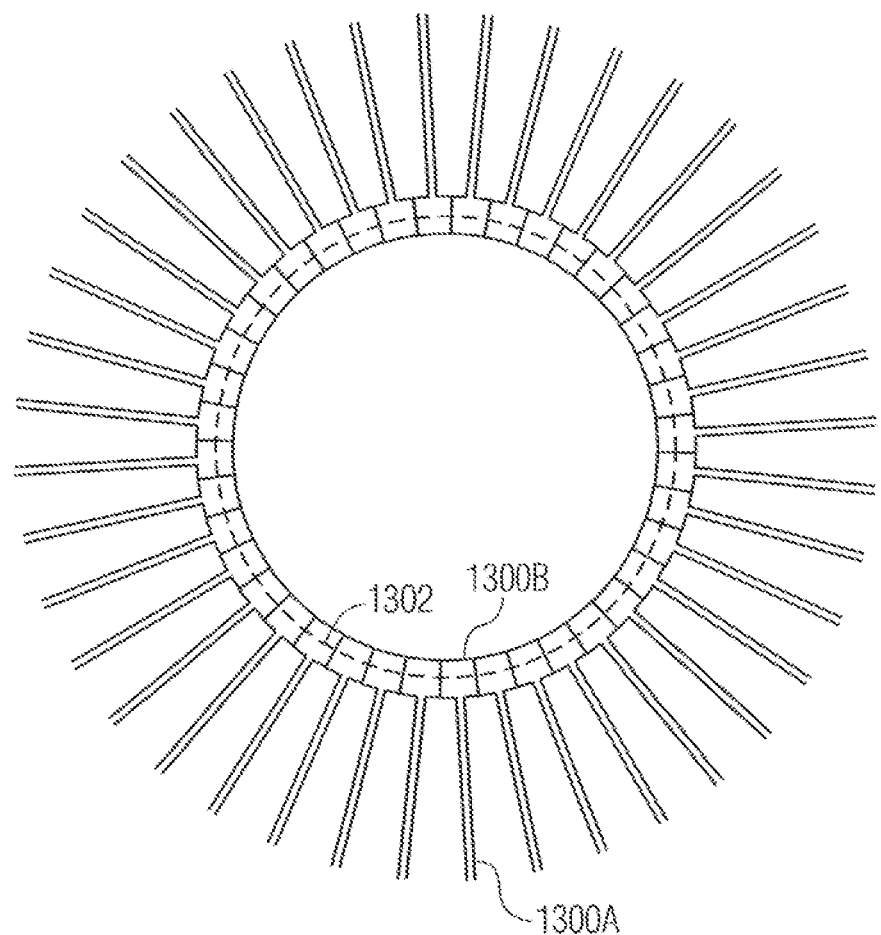
FIG. 13 is a representational diagram of a deflector apparatus with 40 T-shaped first elements in a fully deployed configuration.

FIG. 13 shows a front view of a fully deployed engine protection device with 40 first elements (1300A), in which first element has a terminal protuberance (1300B) which is analogous to 1001 and 1003 of FIG. 10A herein. Cable or cables 1302, analogous to the cable shown in any of the configurations of FIGS. 5A, 5B and 5C, serve to draw the protuberances together as the device is deployed, and to stabilize the protuberances as the device is retracted. In addition 1302 may secure each of the protuberances 1300B so that they are in secure contact with each other. Another mechanism for securing each 1300 to its two adjacent neighboring 1300Bs is to have the surface of each form a secure fit with its neighboring 1300B, either because the surfaces are parallel, or because the surfaces have complementary extensions and depressions which promote such a fit. Furthermore, by making the projections and depressions cone-shaped rather than cylindrical, a non-perfect alignment of adjacent first elements during deployment may be corrected for.

In another embodiment of the invention, a magnetic attraction between adjacent protuberances may be used to promote their attraction during deployment. The magnetic mechanism may be from fixed elements (e.g. one side of each protuberance is a north magnetic pole, and the other side is a south pole, such that the arrangement is:

... (N-S)-(N-S)-(N-S)-(N-S) ...

Figure 14:
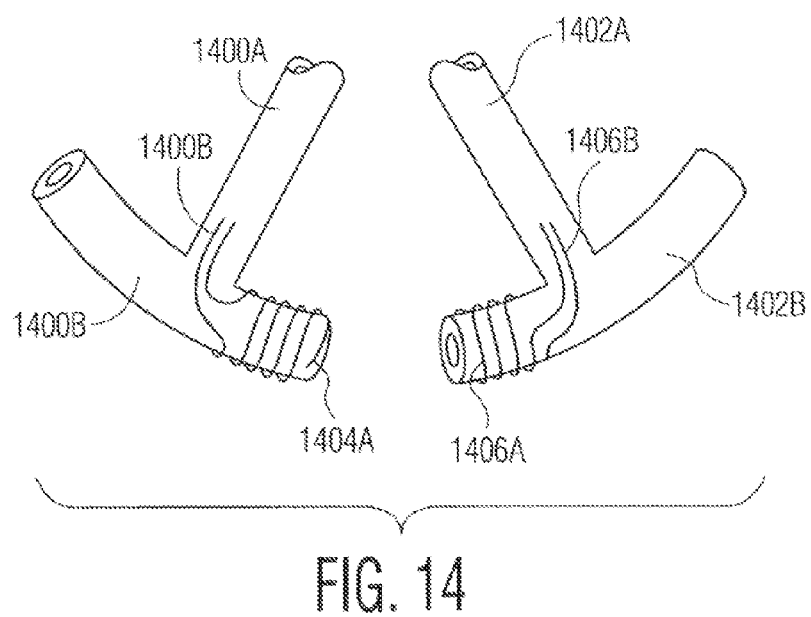
FIG. 14 is a representational diagram of two T-shaped first elements with electromagnetic apparatus at two adjacent projections.

Alternatively, the source of magnetism may be electromagnetic, as shown in FIG. 14, thereby allowing for a simple means of turning off the attractive mechanism. FIG. 14 shows a coil of conducting wire 1404A on one end of first element 1400A for generating a magnetic field when a current is passed through it. The wires need not be on the surface of the object, and may be embedded beneath the surface. The ends of the coil 1404B pass through the shaft of 1400A to a power supply and control unit. There is corresponding apparatus 1406A on the end of first element 1402A for generating a magnetic field when a current is passed through it. The ends of the coil 1406B pass through the shaft of 1402A to a power supply and control unit. The orientation and winding of the coils is such that 1404A attracts 1406A when a current is passed through each. In a preferred embodiment, additional coils are placed symmetrically on each projection, i.e. 1400B and 1402B, to allow for the attraction to each of their respective neighboring projections.

In yet another embodiment of the invention, an active locking mechanism between adjacent protuberances is possible. Activation and deactivation of the locking mechanism may be electric or via one or more cables which traverse one or more of first elements with such a mechanism.

Figure 15A:
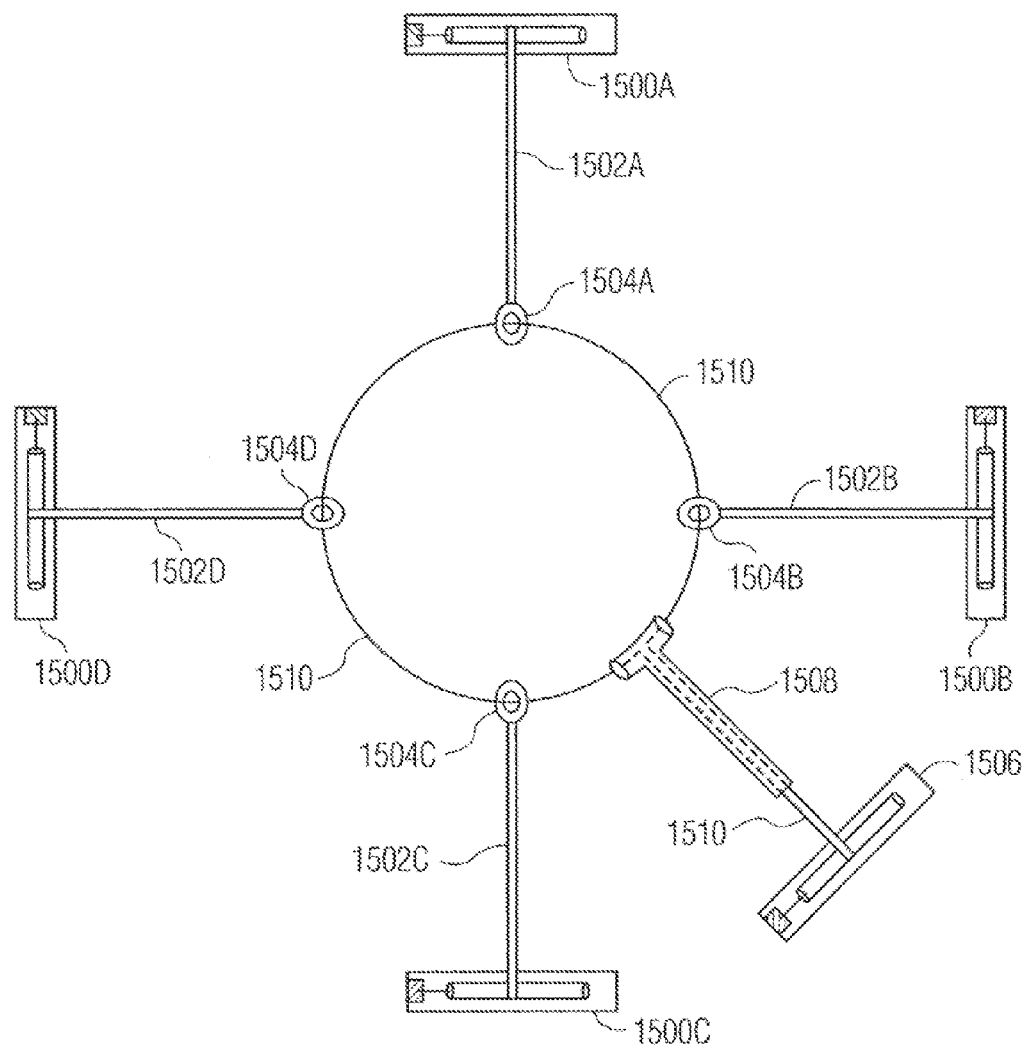
FIG. 15A is a representation diagram of a deflector apparatus with four cable-based first elements, four winches for adjusting the length of the respective cables, and a cable-based second element associated with a tubular T-shaped additional first element and with an additional associated winch.

FIG. 15A shows an embodiment of the invention in which the first elements are not composed of rigid rods. These first elements consist of cables 1502A-D. At their respective proximal ends are cable take-up and release apparatus 1500A-D; At their respective distal ends is an eyelet 1504A-D, which allows each of 1502A-D to be pulled during the deployment process. Deployment is caused when cable take-up 1506 winds in 1510, causing the perimeter of this cable loop to decrease. As the decrease occurs cables 1502A-D are pulled out of 1500A-D. The tension on the loop 1510 exerted by each of 1500A-D is adjusted to keep loop 1510 centered over the air intake. In one version of this embodiment of the invention, an apparatus 1520 (either electromechanical, hydraulic or pneumatic) pushes 1508 distally (toward the center of the air intake) during deployment. The retraction of the deflector involves active uptake of cables 1502A-D by take-up apparatus 1500A-D, with simultaneous spooling out of cable from 1506. In the version which includes 1520, it may be used to facilitate the retraction of 1508. The tension of each of 1500A-D on each respective one of 1502A-D is adjusted, during the retraction process, to keep the deflector properly centered at all times.

Figure 15B:
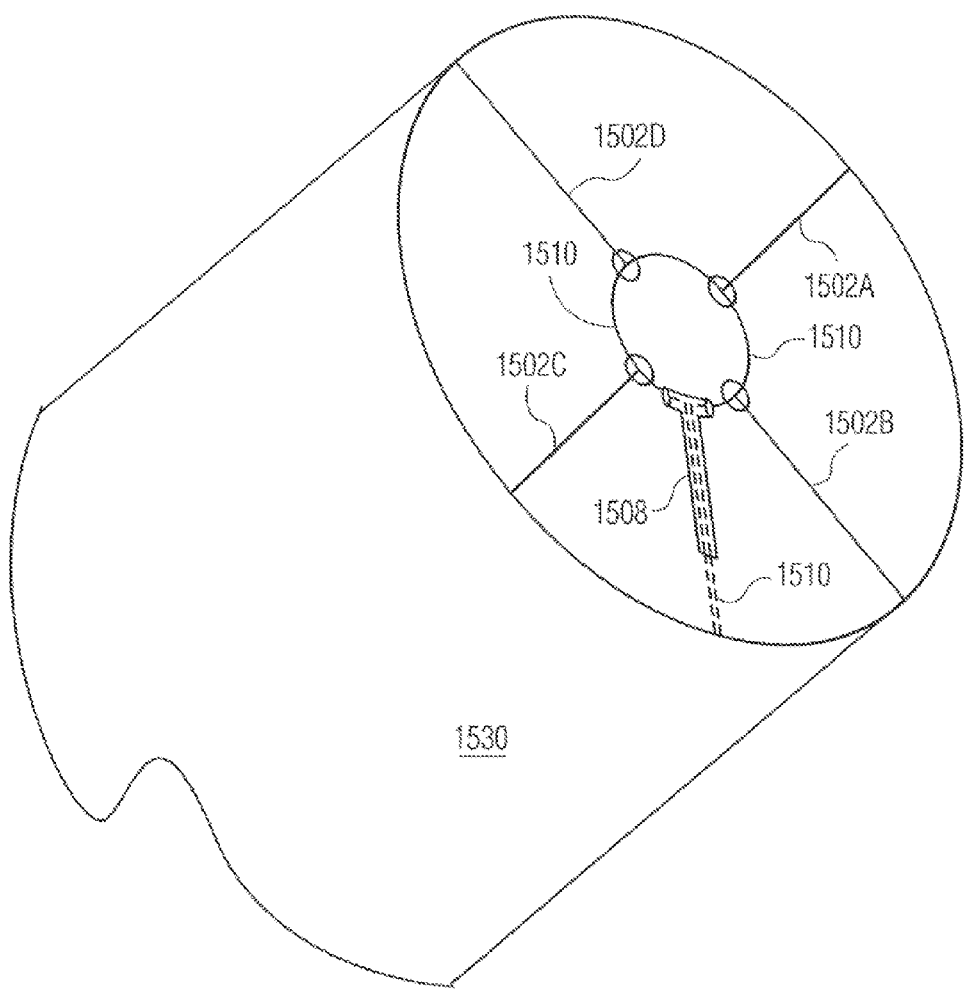
FIG. 15B is a perspective view of a jet engine with a deployed deflector having the apparatus shown in FIG. 15A.

FIG. 15B shows a perspective view of a jet engine 1530, and the first elements and second elements (with element numbers corresponding to those of FIG. 15A) which make up this embodiment. The embodiment shown in the figure contains no rigid support elements except for 1508. It would therefore be situated at the mouth of the engine.

Versions of this embodiment with two or more sets of apparatus to shorten loop 1510 are possible. Versions are also possible in which each of 1502A-D is a rigid telescoping rod, anchored to the engine housing, and deployed by the force exerted by cable take-up device 1506.

Figure 16A:
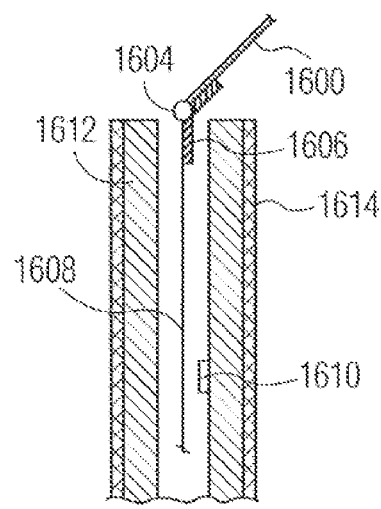
FIG. 16A is a cross sectional view of a portion of a hinge and a hinge-controlling apparatus for attaching a first element to a jet engine, showing a deployed state of the first element.
Figure 16B:
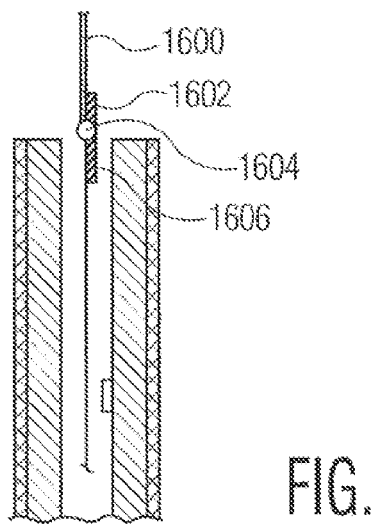
FIG. 16B as a cross sectional view of the hinge and hinge-controlling apparatus of FIG. 16A, showing a transitional state between the deployed state and the retracted state.
Figure 16C:
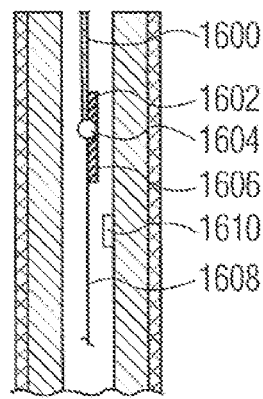
FIG. 16C is a cross sectional view of the hinge and hinge-controlling apparatus of FIG. 16B, showing the retracted state.

FIGS. 16A-16C show an embodiment of a hinge which anchors a first element 1600 to the engine housing, and is retractable. The first element is joined to one hinge component 1602, and retraction rod 1608 is joined to the other hinge component 1606. 1602 and 1606 pivot about 1604. 1608 is moved in and out by apparatus 1610, either mechanically or electromagnetically. 1608 is anchored to inner housing wall 1612 (anchoring not shown in figure), which is contiguous with 1614 which is the support apparatus for the engine.

Figure 17:
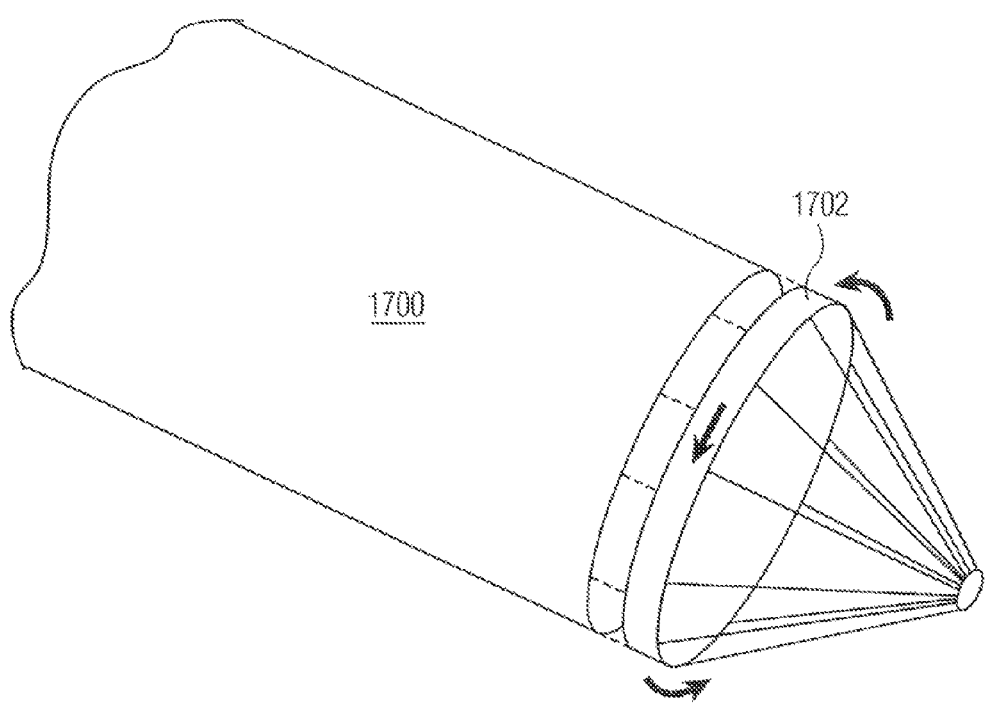
FIG. 17 is a perspective view of a jet engine with a deployed deflector apparatus having multiple straight first elements and a single transverse second element, with the deflector apparatus showing rotational motion about the longitudinal axis of the engine.

FIG. 17 shows an embodiment of the invention in which the first and second elements apparatus rotate along the long axis of the engine, thereby to reduce the aerodynamic consequences of a fixed first element configuration, to reduce asymmetric engine wear, and to more efficiently deflect debris and/or birds. In the figure, the base of the deflector apparatus 1702 is contiguous with engine 1700, but is able to rotate about the long axis of the engine.

Embodiments of the inventions hereinabove are possible in which:
1) There is more than one distal cable running around the circumference of the device, to impart additional stability; 2) There are two or more cables running in parallel through the transverse/non-distal second elements (one cable illustrated hereinabove); 3) The cable is replaced or supplemented by one or more ribbon shaped elements; 4) There are two tandem deflector apparatuses, each of which has the appearance of all of the protection elements shown in FIG. 11A (or 11B, 1A, 1B, 8A or 8B). In a preferred embodiment of the invention, the first elements of the first apparatus are placed so that debris which passes through the outer apparatus is geometrically unlikely to pass through the second apparatus. The longitudinal first elements of the outer apparatus may have a different angular location than those of the inner apparatus, and/or the transverse elements of the outer apparatus may be situated in a more (or less) distal location than those of the inner apparatus. The outer apparatus may rotate (a) at a different speed than the inner one; and/or (b) in a different direction than the inner one; 5) The arrangement of first elements functions to (a) deflect airborne debris, and/or (b) break up airborne degree into smaller pieces. 6) Embodiments of the invention with other first element retraction and extension mechanism are possible. 7) Embodiments of the invention with other stabilizing mechanisms for the distal end of the first elements are possible. 8) Embodiments of the invention with a device, such as a device for passing electric current through the deflector elements, for maintaining the temperature of the elements above freezing, thereby to prevent formation of ice on the deflector.

The retractable bird and debris filter described heretofore consists of elements which project forwards from the jet engine. A second type of retractable bird and debris filter is comprised of elements largely confined to the vicinity of a plane defined by the forward opening of the engine, described hereinbelow.

Figure 18A:
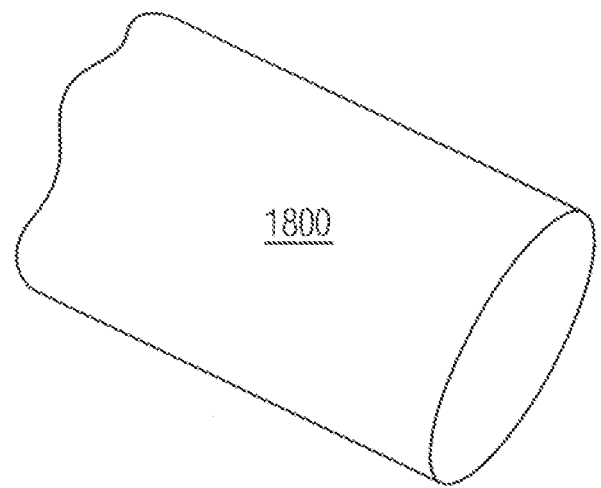
FIG. 18A shows a representational oblique view of a jet engine.
Figure 18B:
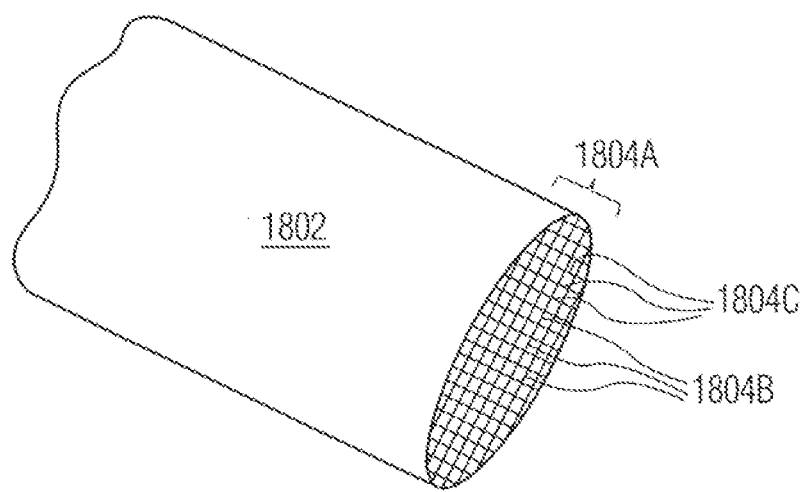
FIG. 18B shows a representative oblique view of a jet engine with a fully deployed bird and debris filter comprising two sets of elements.

FIGS. 18A and 18B show a jet engine with such a bird and debris filter in the retracted, and in the deployed state, respectively.

FIG. 18A shows a perspective view of a jet engine 1800, with air intake shown on the right side of the figure. The filter is in the retracted state, and is not seen in the figure.

FIG. 18B shows a perspective view of engine 1802, with deployed filter 1804A. The filter shown in the figure has two sets of parallel linear filter elements, with one set of elements 1804B oriented perpendicular to the other set 1804C. Embodiments of the invention with one set, and with three or more sets of filter elements are possible. Embodiments of the filter in which one filter element is neither perpendicular nor parallel to another filter element are possible. In the embodiment of the filter shown in the figure, the filter elements form a grid over the air intake of the engine.

Clearly, increasing either (a) the number of filter elements or (b) the thickness of the elements, the greater the impedance to engine air intake. On the other hand, small numbers of filter elements or excessively thin elements will decrease the effectiveness of the filtration process.

The filter elements may be metallic, may be composed of a non-metal, or may be a composite of metallic and non-metallic elements. Each filter element may comprise a single strand of material or multiple strands comprising a cable. The strands, if multiple, may or may not be twisted or braided. The filter elements may or may not have elastic properties. Other filter element configurations will be apparent to those skilled in the art.

Figure 19A:
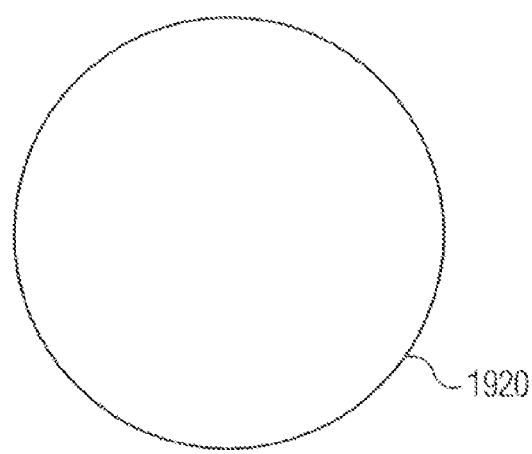
FIGS. 19A-19E shows a schematic of the gradual deployment of a bird and debris filter with two groups of elements.

FIGS. 19A-19E show a schematic view of an example of the process of deployment of a set of vertically oriented filter elements, as seen looking into the engine from the air-intake side. FIG. 19A shows the retracted state of the filter, i.e. no filter elements are seen. The engine perimeter is indicated by 1920.

Figure 19B:
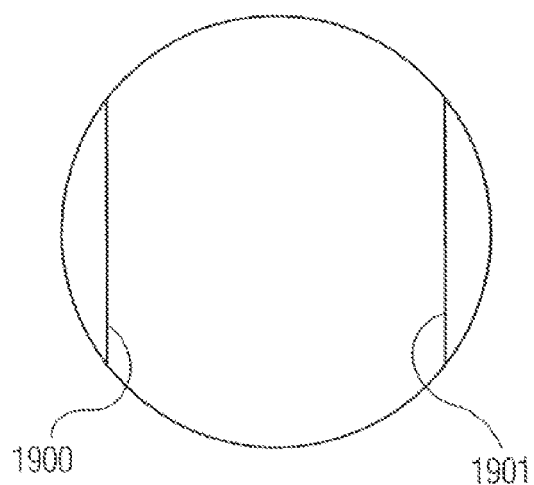

In FIG. 19B, the beginning of the filter element deployment process, one filter element 1900 extends, vertically oriented, across the left hand portion of the air intake, having moved from a storage location (not shown in this figure) at the extreme left of the figure. Another filter element 1901 extends, vertically oriented, across the right hand portion of the air intake, having moved from a storage location (not shown in this figure) at the extreme right of the figure.

Figure 19C:
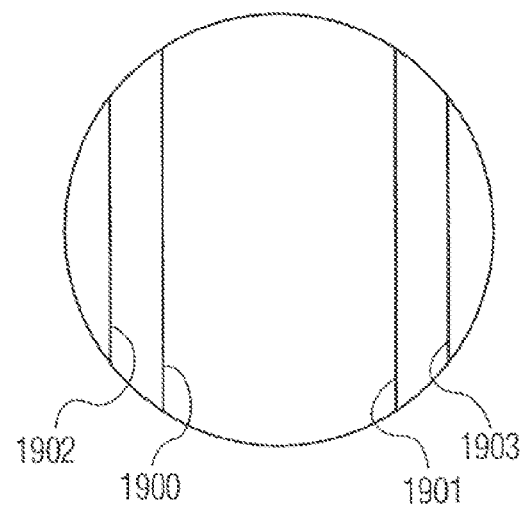

FIG. 19C shows further progression of the deployment process beyond that shown in FIG. 19B:
On the left side of the figure, tilter element 1900 has moved further to the right, and additional filter element 1902 has begun to traverse the intake opening; and
On the right side of the figure, filter element 1901 has moved further to the left, and additional filter element 1903 has begun to traverse the intake opening.

Figure 19D:
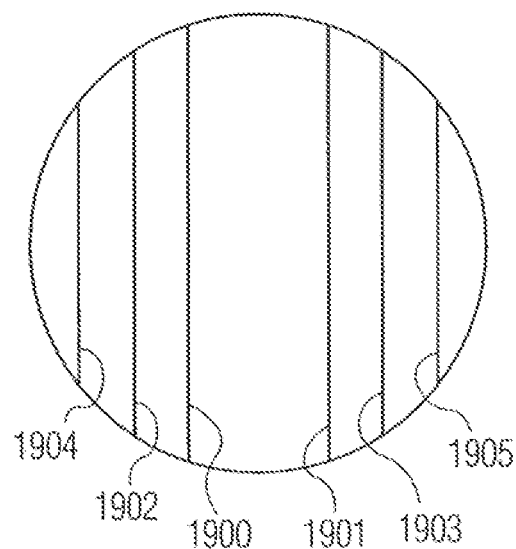

FIG. 19D shows another step in the progression of the deployment process beyond that shown in FIG. 19C:
On the left side of the figure, filter elements 1900 and 1902 have moved still further to the right, and additional filter element 1904 has begun to traverse the intake opening; and On the right side of the figure, filter elements 1901 and 1903 have moved still further to the left, and additional filter element 1905 has begun to traverse the intake opening.

Figure 19E:
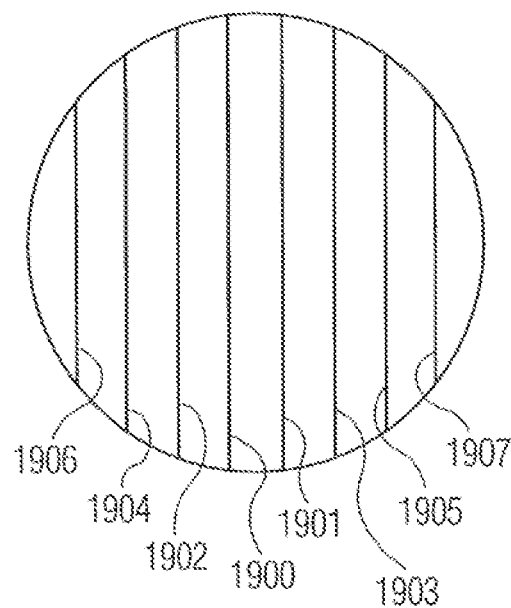

FIG. 19E shows yet another step in the progression of the deployment process, beyond that shown in FIG. 19D:
On the left side of the figure, filter elements 1900, 1902 and 1904 have each moved still further to the right, and additional filter element 1906 has moved to extend across a portion of the intake opening; and
On the right side of the figure, filter elements 1901, 1903 and 1905 have moved still further to the left, and additional filter element 1907 has moved to extend across a portion of the intake opening.

This exemplary figure shows a total of eight filter elements. Embodiments of the invention with a greater or lesser number of elements is possible. In the figure, in the deployed state, spacing between the elements is seen to be roughly equal. Embodiments of the invention in which the spacing is not equal are possible. The four step deployment process shown by FIGS. 19A to 19E is not intended to indicate that deployment is a step-wise process; it may be stepwise, or continuous; and if continuous the elements may move from the retracted to the deployed position at a constant or non-constant speed.

The relative width of the filter elements in the figure is not intended to indicate an actual relative width. The width may vary from element to element among an array of such elements. The width may vary along the length of an individual filter element. The vertical orientation of the filter elements is exemplary, and embodiment of the invention with horizontally oriented elements are possible, as well as embodiments in which the elements are neither vertical nor horizontal. Furthermore, embodiments of the invention are possible in which the filter elements are not parallel to each other—either during the process of deployment or in the fully deployed state.

Figure 20A:
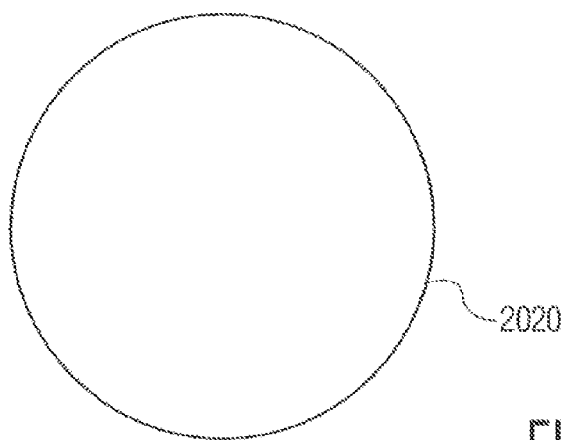
FIGS. 20A-20E shows a schematic of the gradual deployment of a bird and debris filter with one group of elements.

FIGS. 20A-20E show a schematic view of an example of the process of deployment of a set of vertically oriented filter elements, as seen looking into the engine from the air-intake side, in which all of the elements are stored in a single group (FIGS. 19A-19E having shown the case of two stored groups). FIG. 20A shows the retracted state of the filter, i.e. no filter elements are seen. The engine perimeter is indicated by 2020.

Figure 20B:
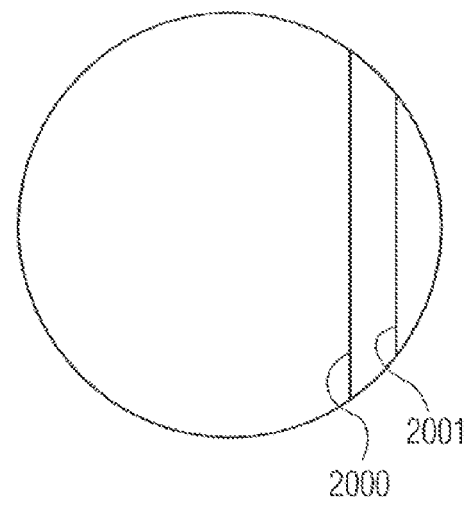

In FIG. 20B, the beginning of the filter element deployment process, two filter elements 2000 and 2001 extend, vertically oriented, across the right hand portion of the air intake, having moved from a storage location (not shown in this figure) at the extreme right of the figure.

Figure 20C:
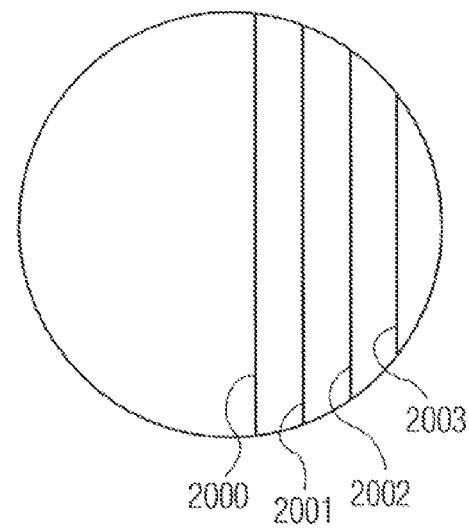

FIG. 20C shows further progression of the deployment process: Filter elements 2000 and 2001 have moved further to the left than their respective positions in FIG. 20B, and additional filter elements 2002 and 2003 have begun to traverse the intake opening.

Figure 20D:
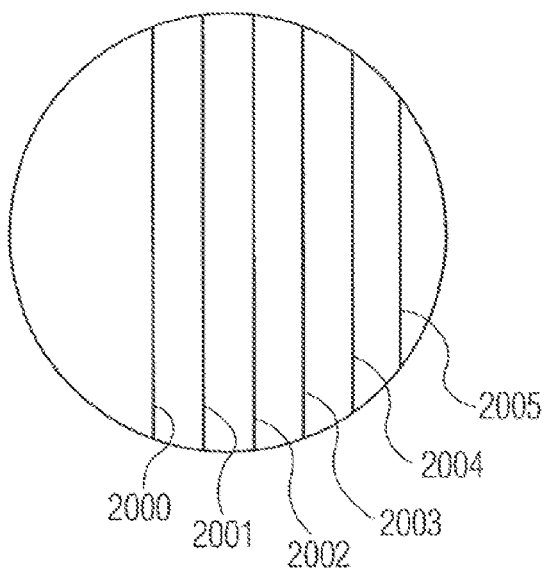

FIG. 20D shows still further progression of the deployment process, beyond that shown in FIG. 20C: Filter elements 2000, 2001, 2002 and 2003 have moved still further to the left than their respective positions in FIG. 20C, and additional filter elements 2004 and 2005 have begun to traverse the intake opening.

Figure 20E:
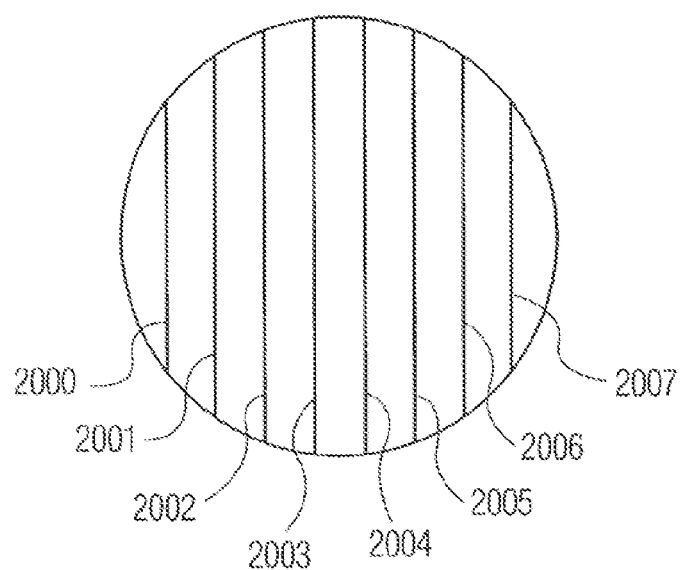

FIG. 20E shows still further progression of the deployment process, beyond that shown in FIG. 20D: Filter elements 2000, 2001, 2002, 2003, 2004 and 2005 have moved still further to the left than their respective positions in FIG. 200, and additional filter elements 2006 and 2007 have begun to traverse the intake opening.

As with the apparatus of FIGS. 19A to 19E, the exemplary set of FIGS. 20A to 20E shows a total of eight filter elements. Embodiments of the invention with a greater or lesser number of elements is possible. In the figure, in the deployed state, spacing between the elements is seen to be roughly equal. Embodiments of the invention in which the spacing is not equal are possible. The four step deployment process shown by FIGS. 20A to 20E is not intended to indicate that deployment is a step-wise process; it may be stepwise, or continuous; and if continuous, the elements may move from the retracted to the deployed position at a constant or non-constant speed.

Figure 20F:
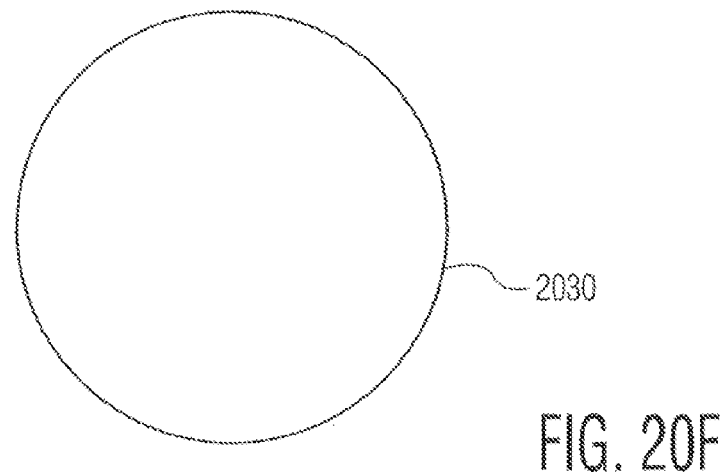
FIGS. 20F-20J shows a schematic view of a mechanism for providing filter elements with multiple orientations without the use of a second filter.
Figure 20G:
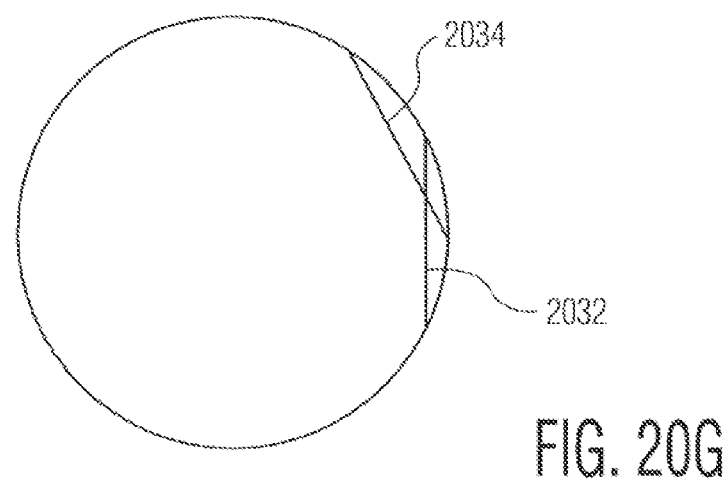
Figure 20H:
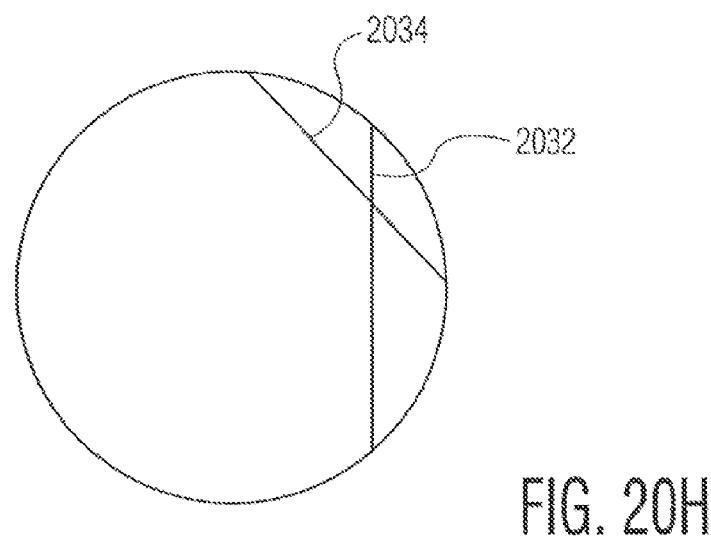
Figure 20I:
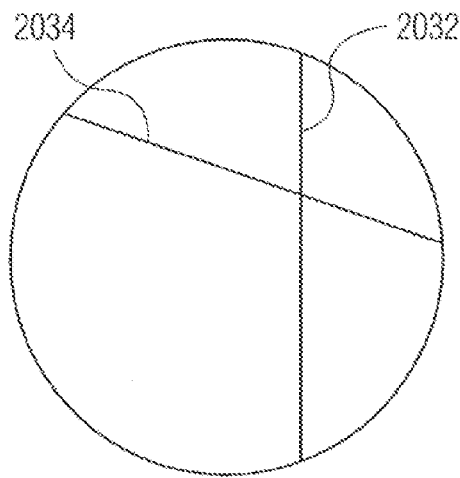
Figure 20J:
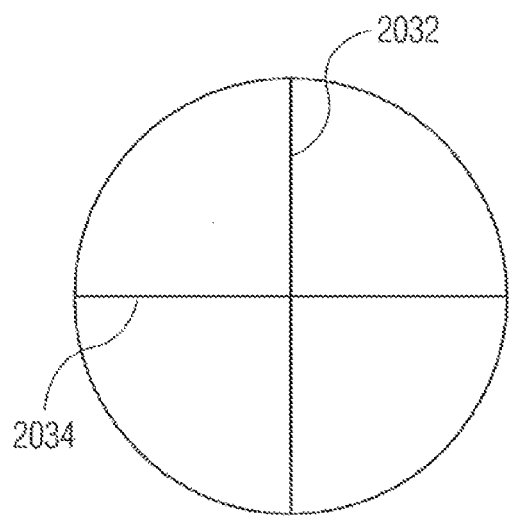

FIGS. 20F-20J show a schematic view of an example of the process of deployment of both a vertically-oriented (2032) and horizontally-oriented (2034) filter element for engine 2030. FIG. 20F shows the fully retracted state; FIGS. 20G through 20I show gradual deployment and FIG. 20J shows full deployment. This mechanism can accommodate larger numbers of filter elements, and can accommodate filter elements with three or more orientations when fully deployed.

The relative width of the filter elements in the figures is not intended to indicate an actual relative width. The width may vary from element to element among an array of such elements. The width may vary along the length of an individual filter element. The vertical orientation of the filter elements is exemplary, and embodiment of the invention with horizontally oriented elements are possible, as well as embodiments in which the elements are neither vertical nor horizontal. Furthermore, embodiments of the invention are possible in which the filter elements are not parallel to each other—either during the process of deployment or in the fully deployed state.

Figure 21:
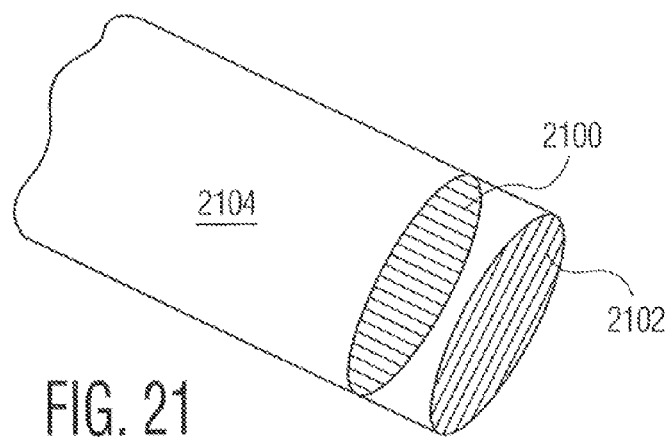
FIG. 21 shows another oblique view of a jet engine with a deployed set of two filters, with elements of one filter aligned in a different direction than that of the elements of the other filter.

FIG. 21 shows tandem filter arrays 2100 and 2102 at the front end of engine 2104. The respective elements of 2100 and 2102 are oriented perpendicular to each other, but in other embodiments, may be at any angle. Embodiments of the invention with one or more additional arrays of filter elements (i.e. a third, fourth . . . array) are possible. The arrays need not be identical.

Figure 22A:
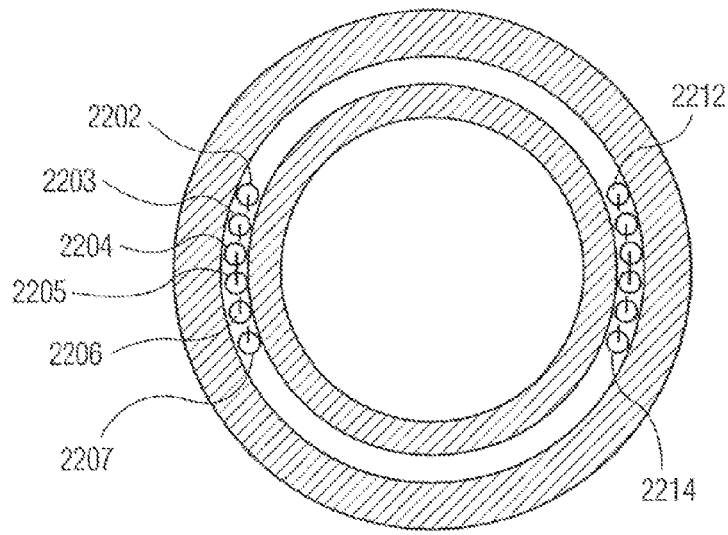
FIGS. 22A and 22B show a schematic frontal view of both filter elements and guiding elements, in the retracted and deployed states, respectively.
Figure 22B:
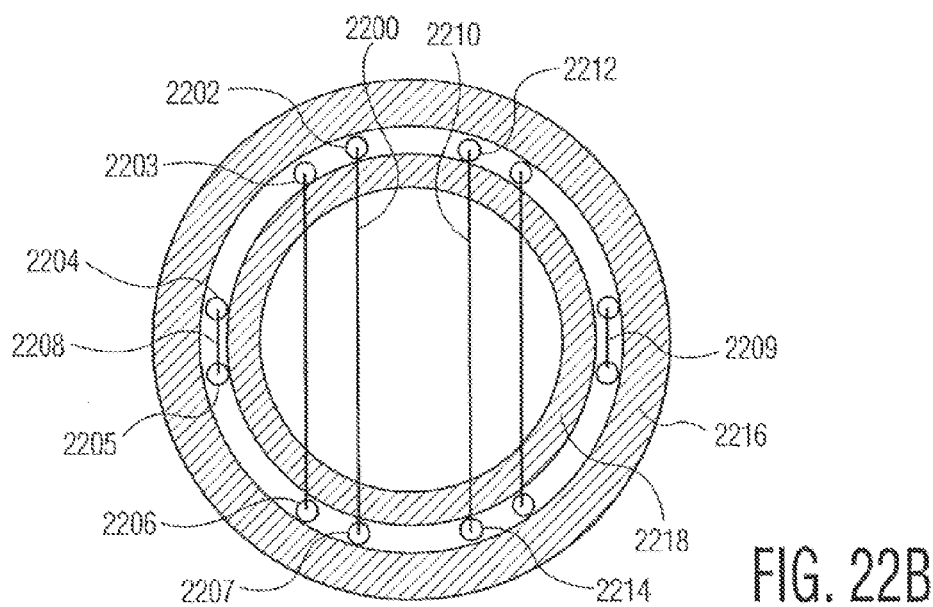

FIGS. 22A and 22B show the placement of guiding elements for the respective filter elements in a retracted configuration and in a partially deployed configuration respectively.

Referring first to FIG. 22B, a partially deployed array of filter elements is shown. The deployed elements include 2200 and 2210 (and two others); the non-deployed elements include 2208 and 2209. Two guiding elements 2202 and 2207 are shown at each end of the line segment which represents filter element 2200. These two guiding elements move 2200 between its deployed position (partially deployed position shown in FIG. 22B) and its retracted position (shown in FIG. 22A).

As discussed hereinbelow (in conjunction with FIGS. 25A and 25B), the guiding elements have structure which facilitates the deployment and take-up of the respective filter element. And as discussed hereinbelow (in conjunction with FIGS. 23A-C and 24A-C) the guiding elements may move either passively (i.e. caused to move by another structure) or may have active means of locomotion.

As shown in FIG. 22B, the guiding elements move between an inner housing 2218 and an outer housing 2216. Also shown in FIG. 22B are filter element 2208 with respective guiding elements 2204 and 2205 in a minimally deployed position; partially deployed guiding element pair 2203 and 2206; partially deployed filter element 2210 with a respective pair of guiding elements 2212 and 2214; and minimally deployed filter element 2209.

FIG. 22A (in which the filter and guiding elements correspond to those with identical element numbers to those in FIG. 22B) shows the retracted state of the filter array. Guiding element pair 2204 and 2205 are shown in the most leftwards position of the figure, with a visible remnant of the filter element extending between them. Guiding element 2203 abuts 2204, and its associated second guiding element 2206 abuts guiding element 2205. Guiding element 2202 abuts 2203, and its associated second guiding element 2207 abuts guiding element 2206. Guiding element pair 2212 and 2214 are shown on the right side of the figure (along with two other pairs of guiding elements), all in the retracted position.

FIGS. 22A and 22B are intended to be exemplary. Those skilled in the art will note many other possible embodiments and configurations, including those with a different number of filter elements; those in which all of the retracted elements are situated in a single group (e.g. on the left side of the figure); those in which retraction is not to the right or left side of the engine (e.g. top and bottom, or top only, or bottom only); those in which the housing configuration differs; those in which the housing shape is not circular; and those in which the guiding and filter elements are not restricted to a one-dimensional placement in the retracted state.

Apparatus corresponding to that shown in FIGS. 22A and 22B will accommodate the filter array shown schematically in FIGS. 20F-20J if the guiding elements for the horizontally oriented (when deployed) filter element(s) extend forward (schematically, above the plane of the figure) to a greater or lesser degree than the guiding elements of the vertically oriented (when deployed) filter element (s). This feature is necessary in filter arrays comprising filter elements with more than one orientation, to accommodate what would otherwise be a "crossing problem"—i.e. the intersection of filter elements if confined to a single plane. Thus the plane occupied by the filter elements of one orientation will differ from the plane occupied by filter elements of another orientation. Furthermore, the orientation of the aforementioned two planes need not be parallel, as long as no part of a filter element in one plane contacts a filter element of another plane, in the deployed state.

For filter arrays with three or more orientations of deployed filter elements, a similar increase in the number of guiding element protrusion amounts would be necessary.

Figure 23A:
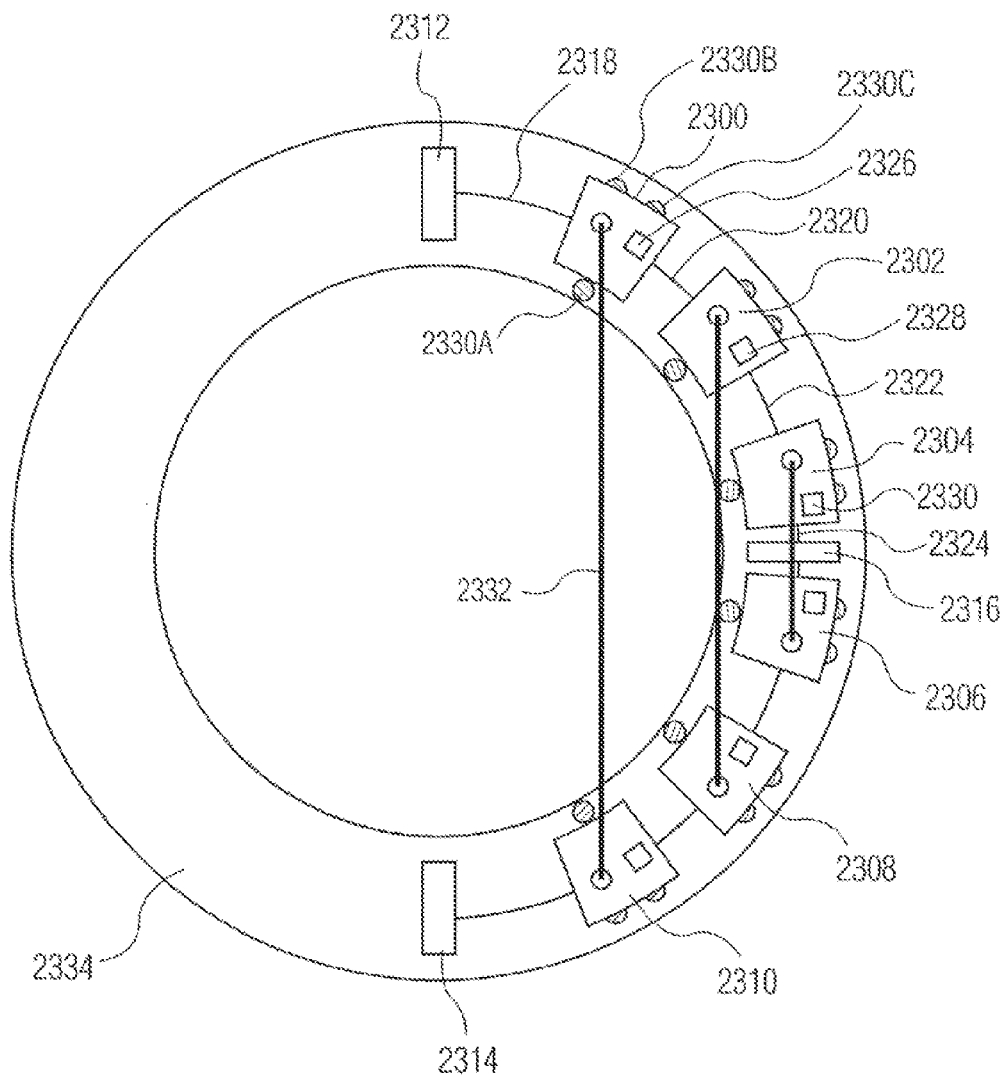
FIGS. 23A-23C show schematic views of exemplary means for causing the positioning of the guiding elements of FIGS. 22A and 22B.
Figure 23B:
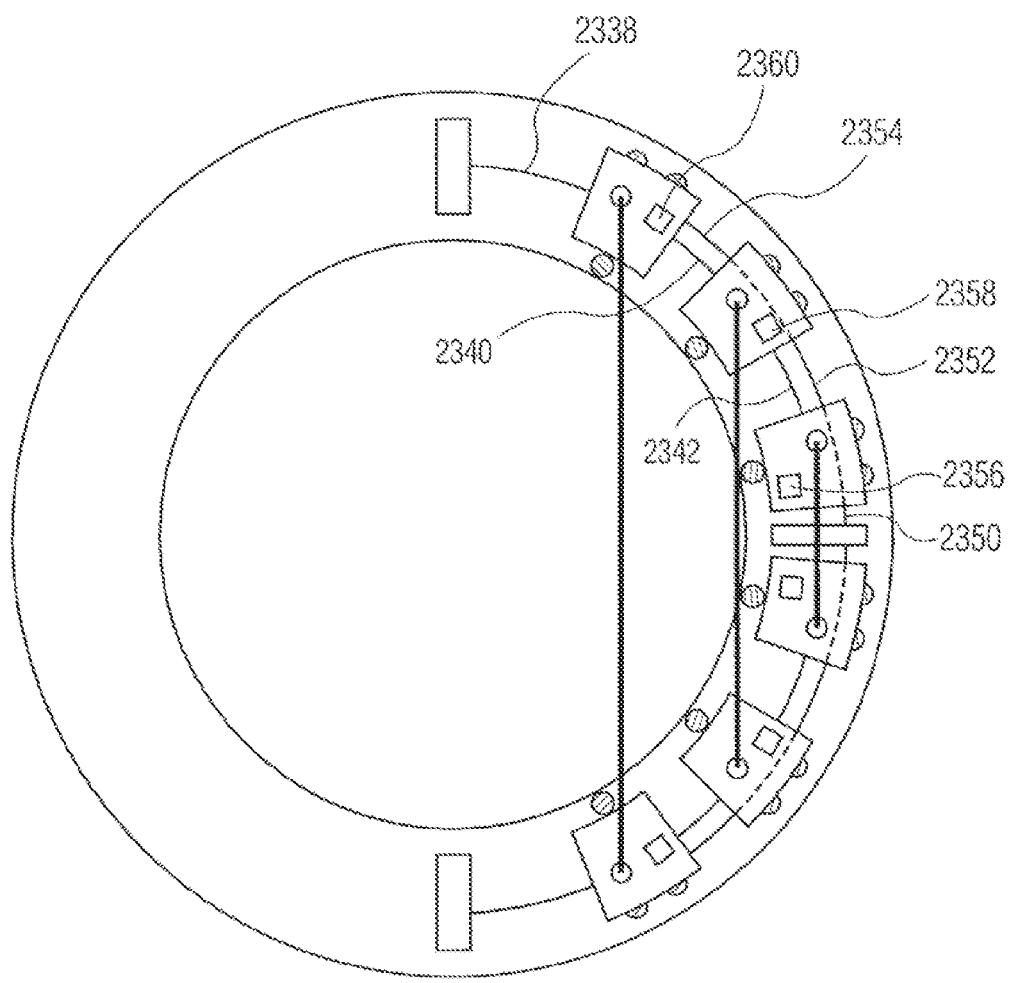
Figure 23C:
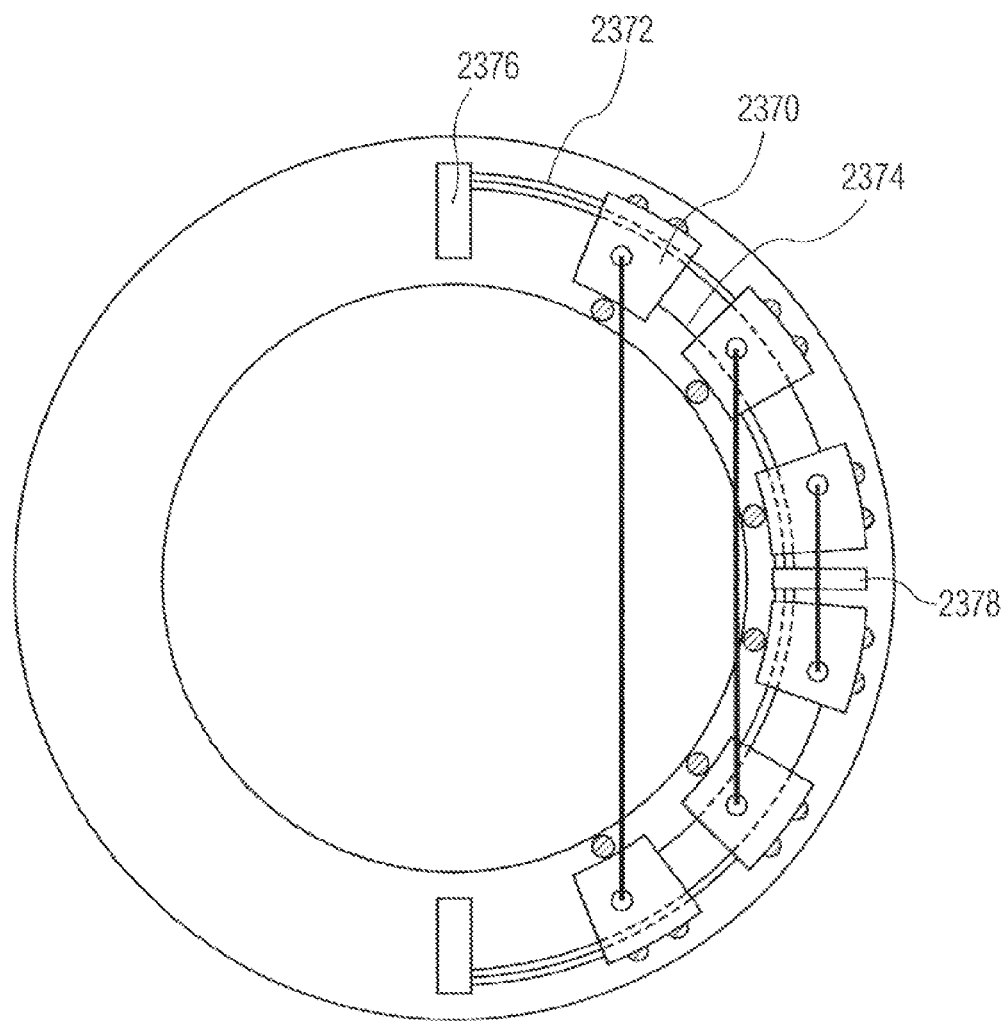

FIGS. 23A-C show schematic representations of a mechanism for causing the movement of guiding elements 2300, 2302, 2304, 2306, 2308 and 2310 in a passive manner—i.e. the guiding elements themselves do not possess an active source of propulsion. The propulsion source during deployment is deployment motors 2312 and 2314. The propulsion source during retraction is retraction motor 2316. Linkage 2318 links guiding element 2300 to deployment motor 2312; linkage 2320 links guiding element 2300 to guiding element 2302; linkage 2322 links guiding element 2302 to 2304; and linkage 2324 links retraction motor 2316 to guiding element 2304.

During deployment, 2312 pulls 2300 via linkage 2318. Guiding element 2302 is caused to move by the motion of 2300, via linkage 2320; and guiding element 2304 is caused to move by the motion of 2302 via linkage element 2322. Linkage control elements 2326, 2328 and 2330 associated with each guiding element control the length of the linkage between guiding elements. Thus, during deployment these lengths increase, and during retraction they decrease. The linkage control elements, in a preferred embodiment of the invention will comprises a motor or motors.

During retraction, 2316 pulls 2304 via linkage 2324. Guiding element 2302 is caused to move by the motion of 2304, via linkage 2322; and guiding element 2300 is caused to move by the motion of 2302 via linkage element 2320. During the process of retraction, the length of the linkage elements between each adjacent pair of guiding elements decreases, under control of linkage control elements 2326, 2328 and 2330. A variety of spring arrangements which will be obvious to those skilled in the mechanical arts may subsidize the retraction process.

The arrangement of linkage control elements need not be one per guiding element: For example, linkage control element(s) in guiding element 2300 could control (a) the length of the linkage between deployment motor 2312 and guiding element 2300 and (b) the length of the linkage between guiding element 2300 and guiding element 2302. A similar dual function linkage control apparatus could be situated in association with guiding element 2304. In the aforementioned arrangement, there would be no need for linkage control apparatus in guiding element 2302.

The position of linkage motors in each of the drawings is not intended to indicate its relative position in the actual apparatus; such position will be obvious to those skilled in the art. The same is true of all of the other elements shown in the figures discussed hereinabove and hereinbelow.

The elements and their function in the lower right portion of the figure are analogous to those in the upper right portion. Furthermore, similar apparatus would be arranged on the left side of the apparatus. Such left sided apparatus could use deployment motors 2312 and 2314, or a second set of deployment motors.

For the embodiment of the invention in which all of the filter elements are situated in one group in the retracted state, deployment motor(s) placement at the left side of the figure could be utilized.

The figure also shows a plurality of bearings, for example 2330A-C for guiding element 2300, to decrease friction during motion. Numerous possible arrangements of bearings are possible. A lubricating system to further decrease friction, not shown, will be desirable.

The figure also shows exemplary figure elements (e.g. 2332) and housing 2334.

FIG. 23B is similar to FIG. 23A except that two types of linkage elements are shown: linkage deployment elements 2338, 2340 and 2342, utilized during the deployment process, and linkage retraction elements 2350, 2352 and 2354. A single linkage control element (2356, 2358 and 2360) is shown in conjunction with each guiding element; configurations with (a) twice as many such elements [i.e. one per linkage element], (b) a larger number of linkage control elements and a smaller number of such elements are possible.

FIG. 23C is analogous to FIGS. 23A and 23B, except that in the configuration shown in FIG. 23C each guiding element (for example 2370) is associated with (a) a linkage element (e.g. 2372) which links it directly to deployment motor 2376, and (b) a linkage element (e.g. 2374) which links it directly to retraction motor 2378. In such a configuration, linkage control elements are not necessary; the deployment motor(s) and the retraction motor(s) perform this function.

Figure 24A:
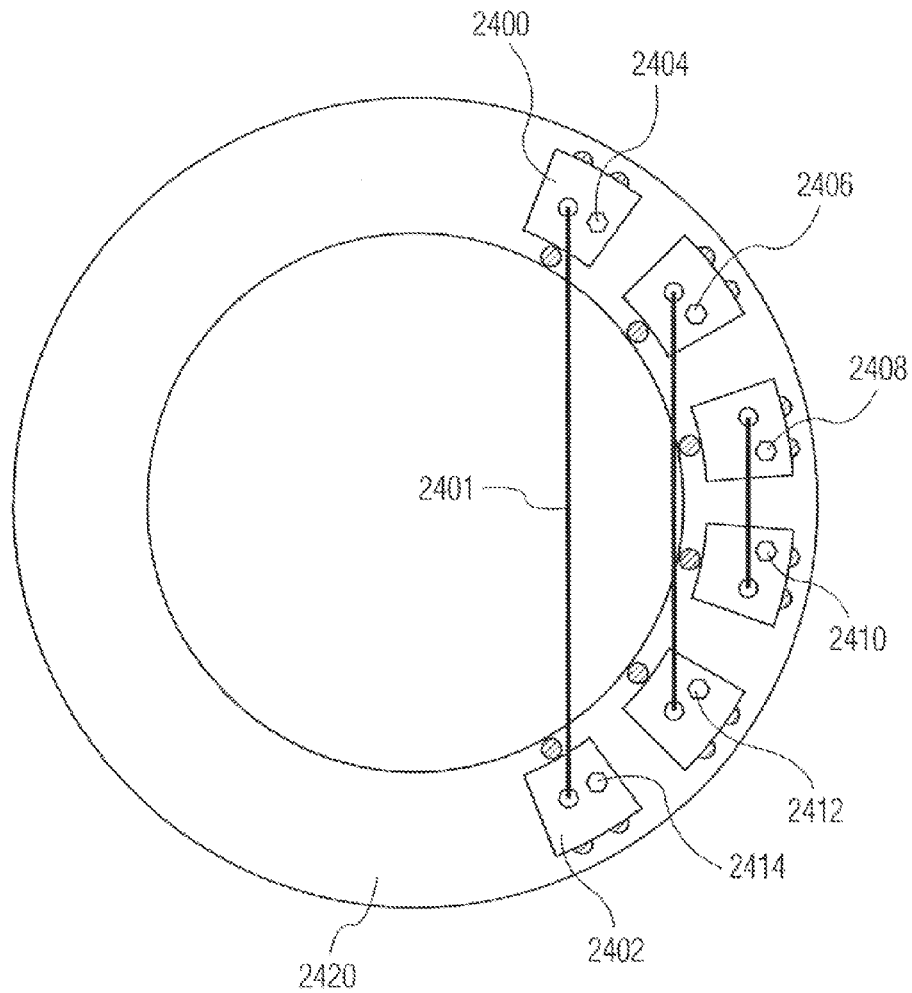
FIGS. 24A-24C show schematic views of exemplary means for causing the positioning of the guiding elements of FIGS. 22A and 22B.
Figure 24B:
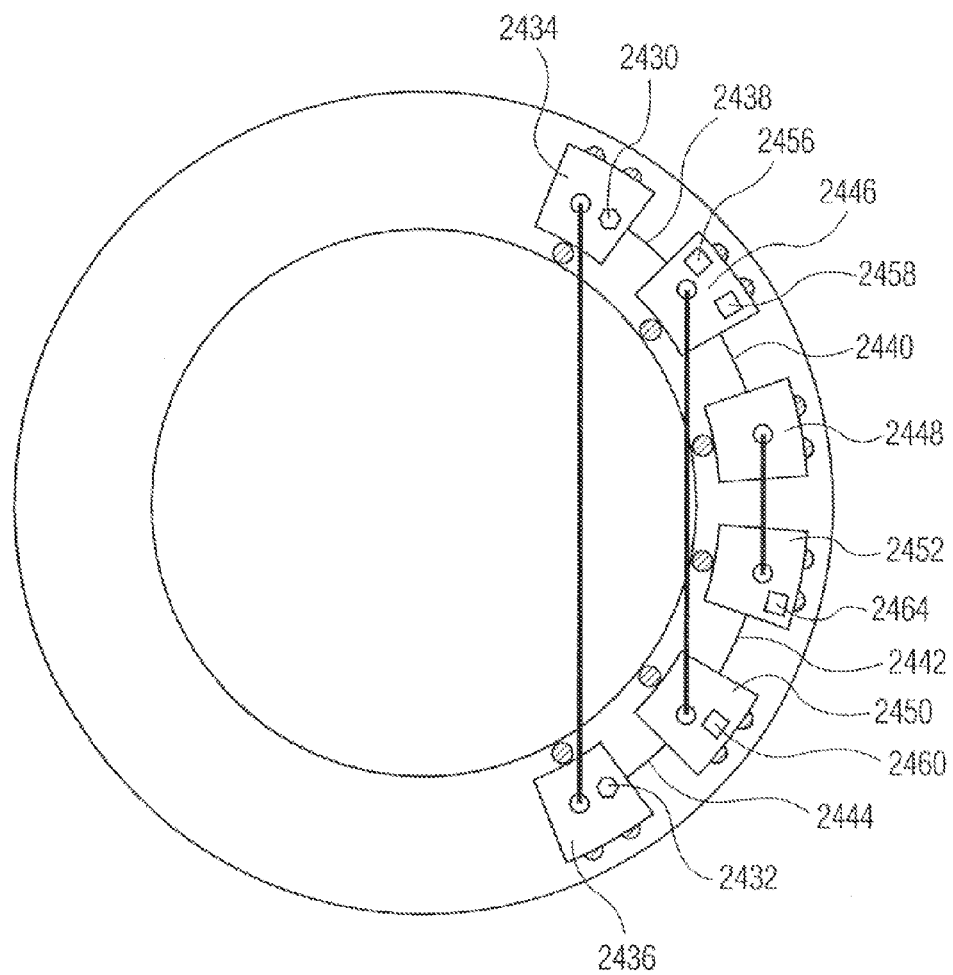
Figure 24C:
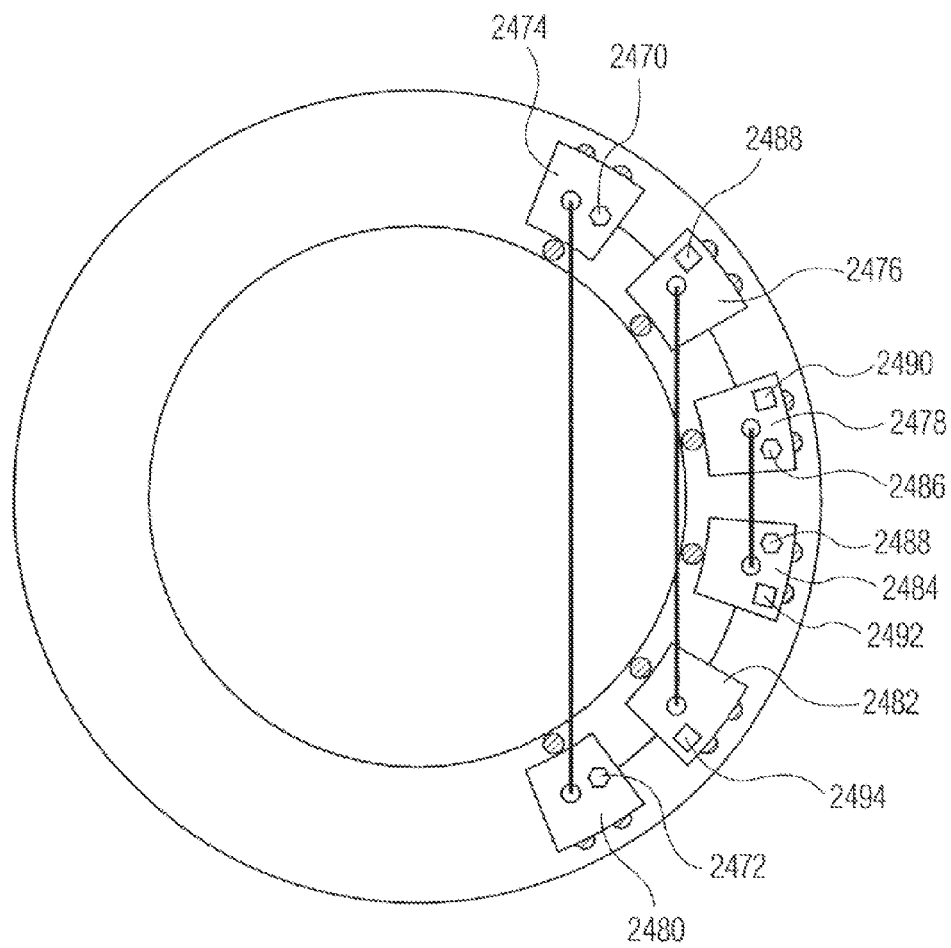

FIG. 24A-24C comprise apparatus analogous to that of FIGS. 23A-C, but in 24A-C the means for causing propulsion of the guiding elements is part of the guiding element, rather than a separate element.

FIG. 24A shows a guiding element propulsion system in which each guiding element is propelled by a motorized apparatus (hereinabove and hereinbelow referred to as "motor"), indicated by hexagon shapes in figure contained in the guiding element apparatus. Filter element 2401 is shown to extend from guiding element 2400 with motor 2404 to guiding element 2402 with motor 2414. Additional motors are shown (elements 2406, 2408, 2410 and 2412, one each in association with each of the shown guiding elements. The engine housing is indicated by 2420.

FIG. 24B is similar to 24A except:
only the end guiding elements 2434 and 2436 have a respective motor (2430 and 2432); linkage elements 2438 and 2440 allow for the passive deployment of respective guiding elements 2446 and 2448 powered by motor 2430; and linkage elements 2444 and 2442 allow for the passive deployment of respective guiding elements 2450 and 2452 powered by motor 2432.

Examples of two types of linkage control formats and elements are shown in FIG. 24B.

In the first example, two linkage control elements are shown in association with guiding element 2446: Linkage control element 2456 is for slack control and tension maintenance of linkage element 2438; and linkage control element 2458 is for slack control and tension maintenance of linkage element 2440.

In the second example, one linkage control element is shown in association with guiding element 2450: Linkage control element 2460 is for slack control and tension maintenance of each of linkage elements 2442 and 2444.

Numerous other slack/tension maintenance arrangements are possible with zero to two linkage control elements in association with each guiding element.

The retraction process in FIG. 24B could be powered:
By having motor 2430 cause a pushing action of guiding element 2434 in the direction of 2446, and thence in the direction of 2448 (with a pulling motion away from these respective guiding elements have cause the deployment of these guiding elements); and by having motor 2432 cause a pushing action of guiding element 2436 in the direction of 2450, and thence in the direction of 2452 (with a pulling motion away from these respective guiding elements have cause the deployment of these guiding elements);
By motors in the linkage control elements. For example motors 2456 and 2458 would cause guiding elements 2430 and 2448 to approach guiding element 2446, and motor 2460 would cause guiding elements 2436 and 2452 to approach guiding element 2450; In such an example, at least one additional linkage control motor 2464 would be required to complete the retraction process. (2464 would cause the group of guiding elements 2434-2446-2448 to approach the group of guiding elements 2436-2450-2452.)

FIG. 24C shows another configuration for propulsion of guiding elements, in which
"pulling motors" 2470 and 2472 cause deployment of the filter array, with each causing respective guiding elements 2474 and 2480 to move leftwards in the figure; The motion of 2474 during deployment passively causes the motion of guiding elements 2476 and 2478, while the motion of 2480 during deployment passively causes the motion of guiding elements 2482 and 2484; and
"pulling motors" 2486 and 2488 cause retraction of the filter array, with each causing respective guiding elements 2478 and 2484 to move rightwards in the figure; The motion of 2478 during retraction passively causes the motion of guiding elements 2476 and 2474, while the motion of 2484 during retraction passively causes the motion of guiding elements 2482 and 2480.

Linkage control elements 248S, 2490, 2492 and 2494 manage slack/tension control. Numerous other slack/tension control configurations are possible.

In addition, the management of deployment and retraction for filter element configurations in which the retracted state includes two or more groupings of filter elements (as shown for example in FIG. 19) can be accomplished utilizing each of the concepts and mechanisms shown and discussed in conjunction with FIGS. 23A-C and 24A-C.

Numerous other configurations for causing the movement of guiding elements and the management of linkages between them will be apparent to those skilled in the art.

Figure 25A:
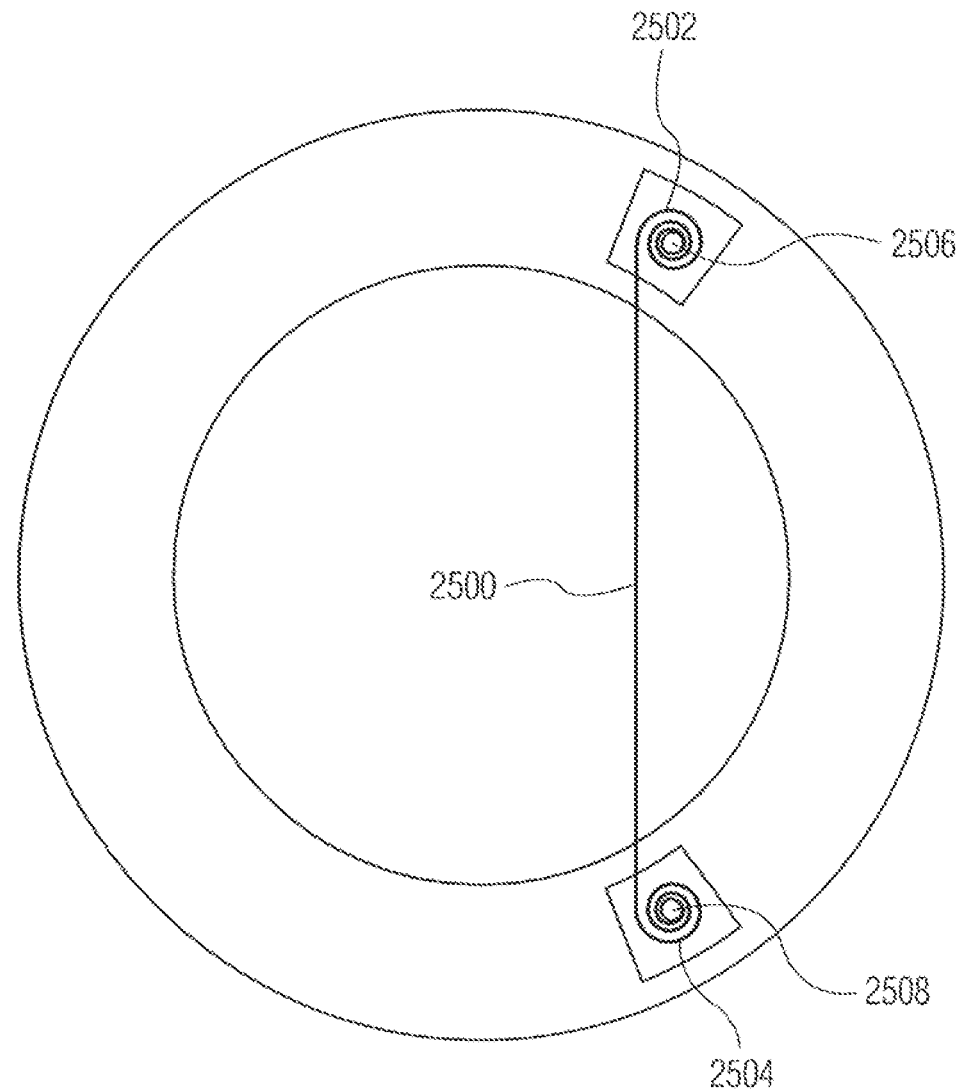
FIGS. 25A and 25B show schematic views of means for releasing a portion of the filter elements during the process of deployment, and taking up a portion of the filter elements during the process of retraction; and show a cleaning apparatus.

FIG. 25A shows one mechanism for allowing the length of a central segment 2500 of a deployed filter element to increase during the deployment process and decrease during the retraction process. The entire filter element consists of (a) a first end segment 2502 shown coiled around shaft 2506, (b) central segment 2500, and (c) a second end segment 2504 shown coiled around shaft 2508. The control of shafts 2506 and 2508 may be either active (motor), passive (spring) or a combination of the two. In the case of a spring-based source of torque for the take-up of slack amounts of the filter element during retraction, the energy for release of additional amounts of filter element during deployment would be caused by the motion of the pair of respective guiding elements.

Figure 25B:
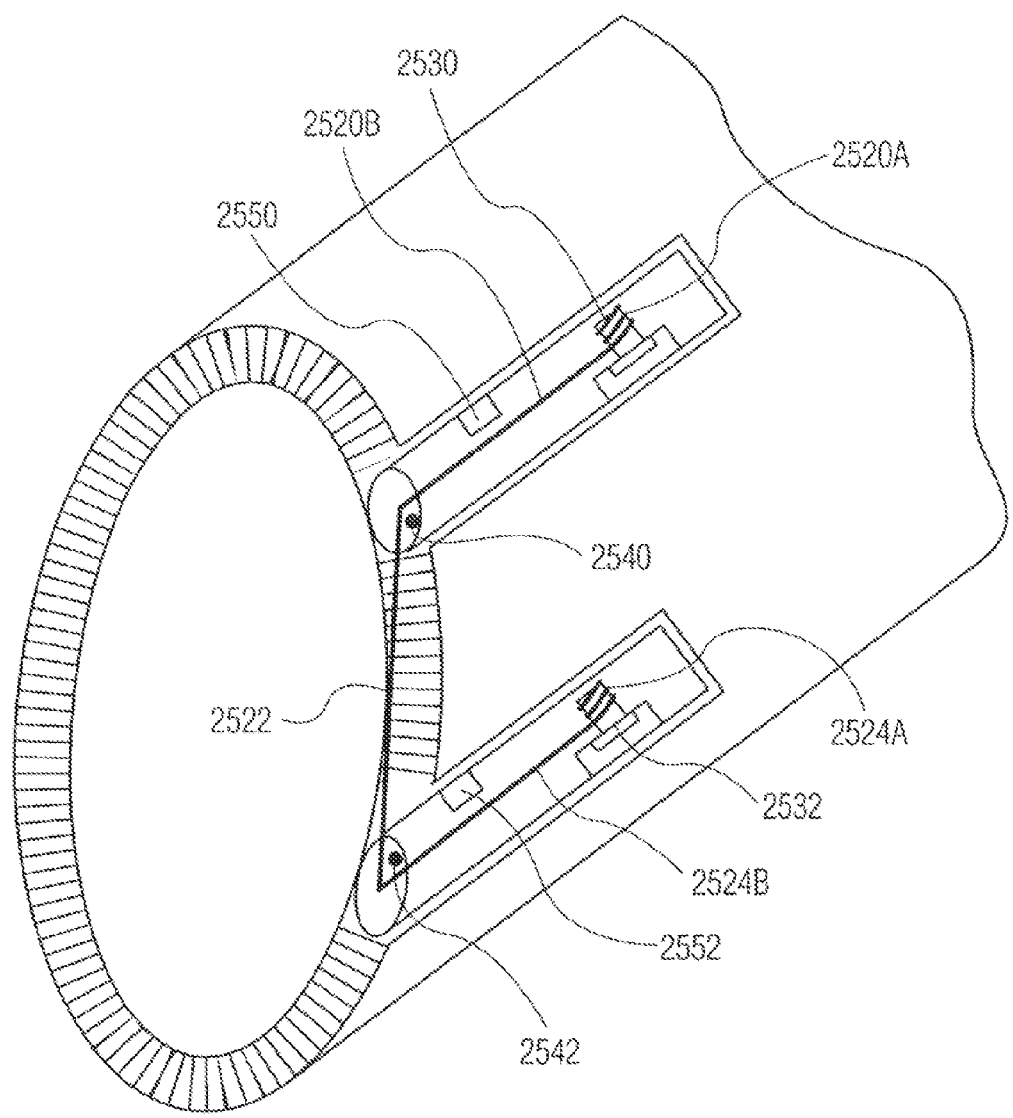

FIG. 25B shows another configuration for making an increasing length of central segment available during filter array deployment, and stowage during filter array retraction. The filter element in the figure comprises:
    a first end segment comprising 2520A (wound around shaft 2530) and unwound portion 2520B, a central segment 2522, and a second end segment comprising unwound portion 2524B and wound portion 2524A (around shaft 2532).

Exemplary bearings 2540 and 2542 are shown, intended to indicate a plurality of bearings with appropriate lubrication.

Whereas the shaft and supporting components of the apparatus shown in FIG. 25A are located approximately in the plane of the front of the engine, these items are located further toward the back of the engine in the FIG. 25B configuration.

Numerous other configurations for release and take-up of filter element material will be apparent to those skilled in the art.

Cleaning apparatus 2550 and 2552 are shown in proximity to the end segments. The cleaning apparatus removes, minimizes and/or consolidates debris that may become attached to the filter elements. It may comprise a nozzle and reservoir for application of a cleaning fluid to the filter element; it may comprise a nozzle and air compression device to apply a blast of air to the filter element; it may comprise warming apparatus to melt ice that may have accumulated on the filter element; it may comprise one or more brushes to mechanically clean the element.

In a preferred embodiment, a catchment apparatus will store accumulated debris. The apparatus may alternatively, or in addition be situated to clean the central segment of the filter element.

Figure 26:
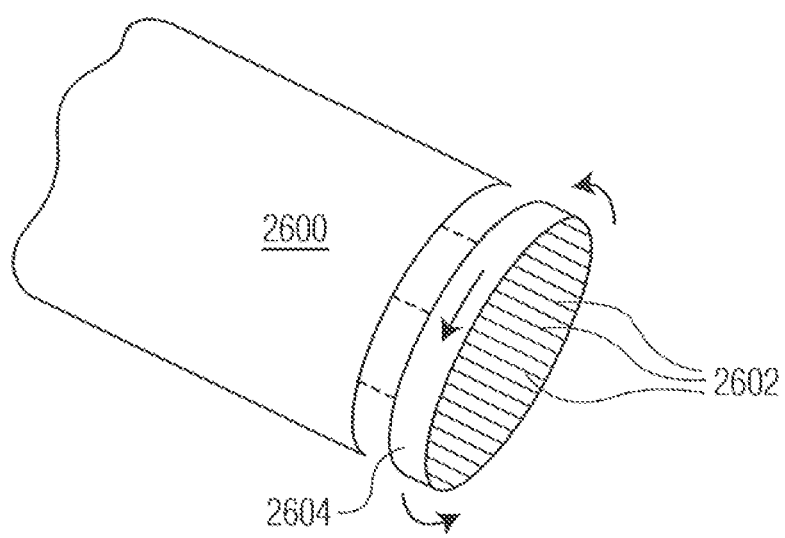
FIG. 26 shows a schematic oblique diagram in which a group of filter elements is operative to rotate about an axis parallel to that of the long axis of the engine.

FIG. 26 shows an embodiment of the invention in which the array 2604 of filter elements 2602 rotates about the long axis of the engine 2600, to increase the efficiency of bird and debris deflection. Dotted lines in the figure indicate that the filter array is attached to the engine. Embodiments of the invention in which two tandem filter arrays (e.g. as shown in FIG. 21) both utilize such rotation are possible. In a preferred embodiment with tandem rotating filter arrays, the angular velocity and direction of rotation of the arrays would differ.

There has thus been shown and described novel retractable bird and debris deflector for an aircraft jet engine which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A retractable bird and debris deflector for an aircraft jet engine comprising an air intake duct with a central longitudinal axis and a forward opening for receipt of air, said forward opening having a perimeter and said deflector comprising, in combination:
    (A) a plurality of elongate members disposed on the air intake duct of the engine in spaced relation to each other, each member having two end segments and a central segment disposed between the two end segments;
    (B) a plurality of guiding members, each mounted for movement along a perimeter of the intake duct and coupled to one end segment of an elongate member, wherein the central segment of each elongate member extends between a pair of guiding members such that the elongate member is movable by said pair of guiding members between a retracted position and a deployed position in front of the intake duct such that:
        (a) in a first, deployed position, said central segments are arranged in front of said forward opening, in spaced relation; and
        (b) in a second, retracted position, said central segments are removed from the forward opening of said intake duct;
whereby said central segments of said elongate members, when in said deployed position, are situated to impede the ingress of debris into said intake duct.

2. The deflector apparatus defined in claim 1, wherein said central segments are maintained in a substantially parallel relationship in the retracted position.

3. The deflector apparatus defined in claim 1, wherein said central segments are maintained in a substantially parallel relationship in the deployed position.

4. The deflector apparatus defined in claim 1, wherein said elongate members are arranged in a single closely spaced grouping when in said retracted position.

5. The deflector apparatus defined in claim 1, wherein said elongate members are arranged in a plurality of closely spaced groupings when in said retracted position.

6. The deflector apparatus defined in claim 1, wherein each said elongate member comprises a flexible cable.

7. The deflector apparatus defined in claim 6, wherein each said cable is comprised primarily of metal.

8. The deflector apparatus defined in claim 6, wherein each said cable is stretchable.

9. The deflector apparatus defined in claim 1, wherein said end segments of said elongate members are disposed inside a housing of said intake duct.

10. The deflector apparatus of claim 6, further comprising a cable take-up mechanism for selectively pulling and releasing said cable forming each elongate member.

11. The deflector apparatus defined in claim 6, further comprising a plurality of motors, each coupled to a respective elongate member, for maintaining tension in said cable during movement from said deployed position to said retracted position.

12. The deflector apparatus defined in claim 11, wherein each said motor is operable to release a respective cable while maintaining cable tension during movement from said retracted position to said deployed position.

13. The deflector apparatus of claim 1, further comprising a motorized mechanism for selectively moving said guiding members.

14. The deflector apparatus defined in claim 1, further comprising at least one motor, coupled to at least one of said pair of guiding members for moving said respective guiding member along said perimeter of said intake duct during movement from said deployed position to said retracted position.

15. The deflector apparatus defined in claim 14, further comprising at least one second motor, coupled to another one of said pair of guiding members for moving said other respective guiding member along said perimeter of said intake duct during movement from said deployed position to said retracted position.

16. The deflector apparatus defined in claim 1, further comprising at least one motor, coupled to one of said pair of guiding members for moving said respective guiding member along said perimeter of said intake duct during movement from said retracted position to said deployed position.

17. The deflector apparatus defined in claim 16, further comprising at least one second motor, coupled to another one of said pair of guiding members for moving said respective guiding member along said perimeter of said intake duct during movement from said retracted position to said deployed position.

18. The deflector apparatus as defined in claim 1 forming a first deflector apparatus, said deflector apparatus further comprising a second deflector apparatus comprising:
   (C) a plurality of second elongate members disposed on the air intake duct of the engine in spaced relation to each other, each second member having two end segments and a central segment disposed between the two end segments;
   (D) a plurality of second guiding members, each mounted for movement along a perimeter of the intake duct and coupled to one end segment of a second elongate member, wherein the central segment of each second elongate member extends between a pair of second guiding members such that the second elongate member is movable by said pair of said second guiding members between a retracted position and a deployed position in front of the intake duct, said central segments of said second elongate members being oriented, in said deployed position, substantially in parallel to each other but not in parallel to the elongate members of said first deflector apparatus, thereby to more fully protect said engine from the ingress of debris.

19. The deflector apparatus defined in claim 18, wherein said central segments of said second elongate members of said second deflector apparatus are oriented substantially perpendicular to said central segments of said elongate members of said first deflector apparatus.

20. The apparatus defined in claim 18, wherein a plane defined by the central segments of said elongate members is different than a plane defined by the central segments of said second elongate members; thereby to prevent intersection between the elongate members and the second elongate members.

21. The deflector apparatus defined in claim 1, wherein said elongate members rotate about an axis perpendicular to a longitudinal axis of said jet engine.

22. The deflector apparatus defined in claim 1, further comprising a cleaning apparatus, coupled to at least one of said guiding members for cleaning said elongate members.

23. The apparatus defined in claim 22, wherein said cleaning apparatus is selected from the group consisting of:
   (i) a nozzle, a reservoir coupled to said nozzle for supplying a cleaning fluid, and a pump coupled to said nozzle for dispersing said fluid through said nozzle, for providing a pressurized spray of said fluid for cleaning said elongate members;
   (ii) a nozzle, an air intake for supplying air, and a pump coupled to said nozzle for providing pressurized air for cleaning said elongate members;
   (ii) a brush for cleaning said elongate members; and
   (iv) a heating element, coupled to a power supply for heating said element, for applying heat to said and thereby cleaning said elongate members.

* * * * *